(12) United States Patent
Leung et al.

(10) Patent No.: US 8,964,788 B2
(45) Date of Patent: Feb. 24, 2015

(54) SYSTEM AND METHOD OF AN IN-BAND MODEM FOR DATA COMMUNICATIONS OVER DIGITAL WIRELESS COMMUNICATION NETWORKS

(75) Inventors: Nikolai K. N. Leung, Takoma Park, MD (US); Marc W. Werner, Nuremberg (DE); Christian Pietsch, Neu-Ulm (DE); Wolfgang Granzow, Heroldsberg (DE); Christian Sgraja, Lauf (DE); Christoph A. Joetten, Wadem (DE); Pengjun Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 374 days.

(21) Appl. No.: 12/477,626

(22) Filed: Jun. 3, 2009

(65) Prior Publication Data

US 2009/0304058 A1 Dec. 10, 2009

Related U.S. Application Data

(60) Provisional application No. 61/059,179, filed on Jun. 5, 2008, provisional application No. 61/087,923, filed on Aug. 11, 2008, provisional application No. 61/093,657, filed on Sep. 2, 2008, provisional (Continued)

(51) Int. Cl.
*H04W 72/00* (2009.01)
*H04L 7/04* (2006.01)

(Continued)

(52) U.S. Cl.
CPC ............. *H04L 7/04* (2013.01); *H04L 1/0003* (2013.01); *H04L 1/1858* (2013.01); *H04L 1/189* (2013.01); *H04L 1/1607* (2013.01); *H04L 7/041* (2013.01); *H04M 11/04* (2013.01)
USPC .......................................... 370/493; 455/450

(58) Field of Classification Search
USPC ......... 370/252, 328, 335, 338, 428, 493, 522, 370/503; 455/426, 493, 550, 556, 557, 572, 455/575, 7, 9, 24, 68, 423, 425, 447, 450
See application file for complete search history.

(56) References Cited

U.S. PATENT DOCUMENTS

| 3,742,197 A | 6/1973 | Pommerening |
| 4,460,992 A | 7/1984 | Gutleber |

(Continued)

FOREIGN PATENT DOCUMENTS

| CN | 1251729 A | 4/2000 |
| CN | 1260658 A | 7/2000 |

(Continued)

OTHER PUBLICATIONS

Mueller A.J. et al: "A DSP Implemented Dual 9600/7200 BPS TCM Modem for Mobile Communications Over FM Voice Radios," Proceedings of the 1997 6th IEEE Pacific Rim Conference on Communications, Computers and Signal Processing, vol. 2, Aug. 20-22, 1997, pp. 758-761, XP000852273, IEEE, New York, NY, USA.

(Continued)

*Primary Examiner* — Michael Thier
*Assistant Examiner* — Prince A Mensah
(74) *Attorney, Agent, or Firm* — Heejong Yoo

(57) ABSTRACT

A system is provided for transmitting information through a speech codec (in-band) such as found in a wireless communication network. A modulator transforms the data into a spectrally noise-like signal based on the mapping of a shaped pulse to predetermined positions within a modulation frame, and the signal is efficiently encoded by a speech codec. A synchronization sequence provides modulation frame timing at the receiver and is detected based on analysis of a correlation peak pattern. A request/response protocol provides reliable transfer of data using message redundancy, retransmission, and/or robust modulation modes dependent on the communication channel conditions.

24 Claims, 23 Drawing Sheets

Related U.S. Application Data application No. 61/122,997, filed on Dec. 16, 2008, provisional application No. 61/151,457, filed on Feb. 10, 2009, provisional application No. 61/166,904, filed on Apr. 6, 2009.

(51) Int. Cl.
| | |
|---|---|
| *H04L 1/00* | (2006.01) |
| *H04L 1/18* | (2006.01) |
| *H04L 1/16* | (2006.01) |
| *H04M 11/04* | (2006.01) |

(56) References Cited

U.S. PATENT DOCUMENTS

| | | | |
|---|---|---|---|
| 4,779,274 A | 10/1988 | Takahashi et al. | |
| 5,043,736 A | 8/1991 | Darnell | |
| 5,216,693 A | 6/1993 | Nakamura | |
| 5,218,618 A | 6/1993 | Sagey | |
| 5,239,497 A | 8/1993 | McKay et al. | |
| 5,341,177 A | 8/1994 | Roy et al. | |
| 5,422,816 A | 6/1995 | Sprague et al. | |
| 5,495,498 A | 2/1996 | Tominaga | |
| 5,519,403 A | 5/1996 | Bickley et al. | |
| 5,539,810 A | 7/1996 | Kennedy, III et al. | |
| 5,550,848 A | 8/1996 | Doshi et al. | |
| 5,555,286 A | 9/1996 | Tendler | |
| 5,640,444 A | 6/1997 | O'Sullivan | |
| 5,712,899 A | 1/1998 | Pace, II | |
| 5,761,204 A | 6/1998 | Grob | |
| 5,786,789 A | 7/1998 | Janky | |
| 5,802,079 A | 9/1998 | Wang | |
| 5,864,763 A | 1/1999 | Leung et al. | |
| 5,918,180 A | 6/1999 | Dimino | |
| 5,978,676 A | 11/1999 | Guridi et al. | |
| 6,044,257 A | 3/2000 | Boling et al. | |
| 6,058,110 A | 5/2000 | Bellenger et al. | |
| 6,058,150 A | 5/2000 | Ghosh | |
| 6,144,336 A | 11/2000 | Preston | |
| 6,208,663 B1 | 3/2001 | Schramm et al. | |
| 6,208,959 B1 | 3/2001 | Jonsson et al. | |
| 6,226,529 B1 | 5/2001 | Bruno | |
| 6,275,990 B1 | 8/2001 | Dapper et al. | |
| 6,345,251 B1 | 2/2002 | Jansson et al. | |
| 6,351,495 B1 | 2/2002 | Tarraf | |
| 6,363,339 B1 | 3/2002 | Rabipour et al. | |
| 6,493,338 B1 | 12/2002 | Preston | |
| 6,526,026 B1 * | 2/2003 | Menon | 370/310 |
| 6,574,211 B2 | 6/2003 | Padovani et al. | |
| 6,690,681 B1 * | 2/2004 | Preston et al. | 370/493 |
| 6,690,922 B1 | 2/2004 | Lindemann | |
| 6,744,747 B2 | 6/2004 | Shiu et al. | |
| 6,754,265 B1 * | 6/2004 | Lindemann | 375/240 |
| 6,947,490 B1 * | 9/2005 | Edwards et al. | 375/261 |
| 6,963,579 B2 | 11/2005 | Suri | |
| 6,993,101 B2 | 1/2006 | Trachewsky et al. | |
| 7,151,768 B2 * | 12/2006 | Preston et al. | 370/350 |
| 7,197,313 B1 | 3/2007 | Sohn | |
| 7,215,965 B2 | 5/2007 | Fournier | |
| 7,221,669 B2 | 5/2007 | Preston | |
| 7,248,685 B2 | 7/2007 | Martin | |
| 7,286,522 B2 | 10/2007 | Preston | |
| 7,394,790 B2 | 7/2008 | Kim et al. | |
| 7,505,417 B2 | 3/2009 | Huh et al. | |
| 7,548,520 B2 | 6/2009 | Kruys | |
| 7,747,281 B2 | 6/2010 | Preston et al. | |
| 7,768,965 B2 | 8/2010 | Kwon et al. | |
| 7,826,604 B2 | 11/2010 | Martin | |
| 7,864,717 B2 | 1/2011 | Dorr | |
| 7,864,745 B2 | 1/2011 | Cai et al. | |
| 7,904,055 B2 | 3/2011 | Lee et al. | |
| 7,912,149 B2 | 3/2011 | Chesnutt et al. | |
| 7,961,654 B2 | 6/2011 | Herring et al. | |
| 8,005,107 B2 | 8/2011 | Suzuki et al. | |
| 8,014,334 B2 | 9/2011 | Lee et al. | |
| 8,059,011 B2 | 11/2011 | Van Wyk et al. | |
| 8,068,792 B2 | 11/2011 | Preston et al. | |
| 8,107,549 B2 | 1/2012 | Joetten et al. | |
| 8,111,734 B2 | 2/2012 | Wang et al. | |
| 8,150,686 B2 | 4/2012 | Pietsch et al. | |
| 8,189,542 B2 | 5/2012 | Beach et al. | |
| 8,295,227 B2 | 10/2012 | Katayama et al. | |
| 2001/0005377 A1 | 6/2001 | Edgar et al. | |
| 2002/0004842 A1 | 1/2002 | Ghose et al. | |
| 2002/0119757 A1 | 8/2002 | Hamabe | |
| 2002/0176446 A1 | 11/2002 | Rasanen | |
| 2003/0063587 A1 | 4/2003 | Cho et al. | |
| 2003/0072357 A1 | 4/2003 | Demir et al. | |
| 2004/0136344 A1 * | 7/2004 | Kim et al. | 370/335 |
| 2004/0174847 A1 | 9/2004 | Menon et al. | |
| 2004/0190663 A1 | 9/2004 | Carsello et al. | |
| 2005/0075103 A1 * | 4/2005 | Hikokubo et al. | 455/423 |
| 2005/0078660 A1 | 4/2005 | Wood | |
| 2005/0111383 A1 | 5/2005 | Grob et al. | |
| 2005/0147112 A1 * | 7/2005 | Sugaya | 370/418 |
| 2005/0169248 A1 | 8/2005 | Truesdale | |
| 2005/0180328 A1 * | 8/2005 | Kim et al. | 370/236 |
| 2005/0207370 A1 | 9/2005 | Harada | |
| 2005/0281243 A1 * | 12/2005 | Horn et al. | 370/345 |
| 2006/0035594 A1 | 2/2006 | Murata et al. | |
| 2006/0133273 A1 | 6/2006 | Julian et al. | |
| 2006/0165190 A1 * | 7/2006 | Tamaki et al. | 375/262 |
| 2007/0025301 A1 | 2/2007 | Petersson et al. | |
| 2007/0030829 A1 | 2/2007 | Vimpari et al. | |
| 2007/0072604 A1 | 3/2007 | Wang | |
| 2007/0142028 A1 | 6/2007 | Ayoub | |
| 2007/0168841 A1 | 7/2007 | Lakkis | |
| 2007/0177630 A1 | 8/2007 | Ranta et al. | |
| 2007/0217526 A1 | 9/2007 | Park et al. | |
| 2007/0241806 A1 | 10/2007 | Pedersen et al. | |
| 2008/0045255 A1 | 2/2008 | Revel et al. | |
| 2008/0082891 A1 | 4/2008 | Park et al. | |
| 2008/0086669 A1 | 4/2008 | Cheng et al. | |
| 2008/0090517 A1 | 4/2008 | Cheng | |
| 2008/0108304 A1 * | 5/2008 | Suga | 455/7 |
| 2008/0165885 A1 | 7/2008 | Kondoz | |
| 2008/0232301 A1 | 9/2008 | Cai et al. | |
| 2008/0310400 A1 * | 12/2008 | Cai et al. | 370/352 |
| 2008/0311939 A1 | 12/2008 | Hugl et al. | |
| 2009/0034483 A1 | 2/2009 | Dominique et al. | |
| 2009/0304057 A1 | 12/2009 | Werner et al. | |
| 2009/0306970 A1 | 12/2009 | Sgraja et al. | |
| 2009/0306974 A1 | 12/2009 | Huang et al. | |
| 2009/0306975 A1 | 12/2009 | Pietsch et al. | |
| 2009/0306976 A1 | 12/2009 | Joetten et al. | |
| 2010/0318351 A1 | 12/2010 | Sgraja et al. | |
| 2011/0142030 A1 | 6/2011 | Pietsch et al. | |
| 2011/0149847 A1 | 6/2011 | Pietsch et al. | |

FOREIGN PATENT DOCUMENTS

| | | |
|---|---|---|
| CN | 1277766 A | 12/2000 |
| CN | 1373948 A | 10/2002 |
| CN | 1377200 A | 10/2002 |
| CN | 1443400 A | 9/2003 |
| CN | 1452845 A | 10/2003 |
| EA | 006007 B1 | 8/2005 |
| EP | 0358582 A2 | 3/1990 |
| EP | 0545783 | 6/1993 |
| EP | 07095189 | 4/1995 |
| EP | 1903747 A1 | 3/2008 |
| EP | 1959693 A1 | 8/2008 |
| EP | 2023519 A1 | 2/2009 |
| JP | 01129628 | 5/1989 |
| JP | H0398344 A | 4/1991 |
| JP | 4347943 A | 12/1992 |
| JP | 5075572 A | 3/1993 |
| JP | 6006324 A | 1/1994 |
| JP | 6169279 A | 6/1994 |
| JP | 7046158 A | 2/1995 |
| JP | 7271487 A | 10/1995 |
| JP | 08046666 | 2/1996 |
| JP | 11196026 A | 7/1999 |
| JP | 2000253187 A | 9/2000 |

(56) References Cited

FOREIGN PATENT DOCUMENTS

| | | | |
|---|---|---|---|
| JP | 2001051928 A | 2/2001 |
| JP | 2001519283 A | 10/2001 |
| JP | 2001326979 A | 11/2001 |
| JP | 2003506924 A | 2/2003 |
| JP | 2003188769 A | 7/2003 |
| JP | 2003521143 A | 7/2003 |
| JP | 2003533908 A | 11/2003 |
| JP | 2003536116 A | 12/2003 |
| JP | 2004088258 A | 3/2004 |
| JP | 2004120432 A | 4/2004 |
| JP | 2004260633 A | 9/2004 |
| JP | 2006086551 A | 3/2006 |
| JP | 2006157477 A | 6/2006 |
| JP | 2006520131 A | 8/2006 |
| JP | 2007110746 A | 4/2007 |
| JP | 2008160742 A | 7/2008 |
| JP | 2011523301 A | 8/2011 |
| JP | 2011523302 A | 8/2011 |
| JP | 2012502509 | 1/2012 |
| KR | 20050110715 | 11/2005 |
| RU | 2099893 C1 | 12/1997 |
| RU | 2154906 C1 | 8/2000 |
| RU | 2005117154 A | 2/2004 |
| RU | 2231924 C1 | 6/2004 |
| RU | 2003130463 A | 2/2005 |
| RU | 2290757 | 12/2006 |
| TW | 200713932 | 4/2007 |
| TW | I291099 B | 12/2007 |
| WO | 8912835 | 12/1989 |
| WO | WO9912303 | 3/1999 |
| WO | 9949677 | 9/1999 |
| WO | 0110102 A2 | 2/2001 |
| WO | 0143386 A1 | 6/2001 |
| WO | 0172067 A1 | 9/2001 |
| WO | 0199295 A2 | 12/2001 |
| WO | WO0221757 | 3/2002 |
| WO | 02075986 A1 | 9/2002 |
| WO | 03019808 | 3/2003 |
| WO | 2004075523 A2 | 9/2004 |
| WO | 2004082305 A2 | 9/2004 |
| WO | 2004088914 A1 | 10/2004 |
| WO | 2005109729 A1 | 11/2005 |
| WO | WO2005109923 | 11/2005 |
| WO | 2005114895 A1 | 12/2005 |
| WO | WO-2006030019 A2 | 3/2006 |
| WO | 2007117892 A2 | 10/2007 |
| WO | 2007139145 A1 | 12/2007 |
| WO | 2007142492 A2 | 12/2007 |
| WO | WO2007143032 A2 | 12/2007 |
| WO | 2008032959 A2 | 3/2008 |
| WO | WO-2008033514 A2 | 3/2008 |
| WO | 2008038248 A2 | 4/2008 |
| WO | 2009099370 A1 | 8/2009 |
| WO | WO2009149352 | 12/2009 |

OTHER PUBLICATIONS

Coleman A. et al: "Subjective Performance Evaluation of the RPE-LTP Codec for the Pan-European Cellular Digital Mobile Radio System," GLOBECOM 1989 IEEE Global Telecommunications Conference and Exhibition, vol. 2, Nov. 27-30, 1989, p. 1075, XP-002143130, IEEE. New York, NY, USA.
Lin D. et al: "Data Compression of Voiceband Modem Signals," 40th IEEE Vehicular Technology Conference on the Move in the 90's, May 6-9, 1990, pp. 323-325, XP000204133, IEEE, New York, NY, USA.
3GPP TS 26.267 V1.0.0 Technical Specification Group Services and System Aspects; eCall Data Transfer: In-band modem solution; General description.
3GPP TR 22.967 V8.0.0 Technical Specification Group Services and System Aspects; Transferring of emergency call data. Chapter 7, p. 11-19.
3GPP2 C.S0014-C Version 1.0 Enhanced Variable Rate Codec, Speech Service Options 3, 68, and 70 for Wideband Spread Spectrum Digital Systems. Chapter 4, p. 4-102-4-107.
3GPP TS 26.226 V8.0.0 Technical Specification Group Services and System Aspects; Cellular text telephone modem; General description. Chapter 8, p. 10-17.
Qixiang Pang et. al, "Performance Improvement of 802.11 Wireless Access Network with TCP ACK Agent and Auto-Zoom Backoff Algorithm." (2005).
3GPP: "3rd Generation Partnership Project;Technical Specification Group Services and System Aspects;eCall Data Transfer—in-band modem solution;(Release 8)" 3GPP Draft; S4-070702 Proposed Enhancements Based on TR 26967-110, 3rd Generation Partnership Project (3GPP), Mobile Competence Centre ; 650, Route Des Lucioles ; F-06921 Sophia-Antipolis Cedex ; France, vol. SA WG4, No. Sophia Antipolis, France; Oct. 31, 2007, XP050289760 [retrieved on Oct. 31, 2007] p. 21-p. 24.
3rd Generation Partnership Project; Technical Specification Group Services and System Aspects Service aspects; Service principles (Release 9) 3GPP Standard; 3GPP TS 22.101, 3rd Generation Partnership Project (3GPP), Mobile Competence Centre ; 650, Route Des Lucioles ; F-06921 Sophia-Antipolis Cedex ; France, No. 9.4.0, Jun. 1, 2009), pp. 1-55, XP050360890.
Andrea Cantini et al.: "Logic and foundations of mathematics" Aug. 1995, Kluwer Acadmic, XP002548457 p. 76-p. 78.
CEN TC278 WG15 (Road Traffic and Transport Telematics et al: "Ecall Application-Layer Acknowledgements Date: June 21, 2009" 3GPP Draft; S1-093210, 3rd Generation Partnership Project (3GPP), Mobile Competence Centre ; 650, Route Des Lucioles ; F-06921 Sophia-Antipolis Cedex ; France, No. Roma; Jul. 23, 2009, XP050355530.
Chochliouros I P et al: "Emergency Call (Ecall) Services Based on Approved E-112 Regulations and Infrastructures: A Solution to Improve Security and Release of Road Help" British Telecommunications Engineering, British Telecommunications Engineering. London, GB, vol. 4, No. 3, Jul. 1, 2005, pp. 76-84, XP001504554 ISSN: 0262-401X abstract.
Digital cellular telecommunications system (Phase 2+); Universal Mobile Telecommunications System (UMTS); eCall data transfer; In-band modem solution; General description (3GPP TS 26.267 version 8.1.0 Release 8) Technical Specification, European Telecommunications Standards Institute (ETSI), 650, Route Des Lucioles ; F-06921 Sophia-Antipolis ; France, No. V8.1.0, Jun. 1, 2009, XP014044645.
Elmir6hani J M H et al: "Frame synchronisation for optical fibre digital PPM" Singapore ICCS/ISITA 92. "Communications on the Move" Singapore Nov. 16-20, 1992,New York, NY, USA,IEEE, US, Nov. 16, 1992, pp. 1018-1022, XP010067205 ISBN: 978-0-7803-0803-9 p. 1018, right-hand column, last paragraph—p. 1020, left-hand column, paragraph 1; figures 2,3,5,6.
Fan Yu et al: "Toward In-Band Self-Organziation in Energy-Efficient MAC Protocols for Sensor Networks," IEEE Transactions on Mobile Computing, IEEE Service Center, vol. 7, No. 2, Feb. 1, 2008, pp. 156-170.
Gutleber F S: "Spread Spectrum Multiplexed Noise Codes" Milcom Conference Record, XX, XX, vol. 1, Oct. 17, 1982, pp. 15.1.1-15.1. 10, XP000677820 p. 15.1.3, left-hand column, last paragraph—right-hand column, paragraph 1.
Intelligent transport systems a ESafety a ECall High level application protocols 3GPP Draft; W15-0180 HLAP PT Final 090710, 3rd Generation Partnership Project (3GPP), Mobile Competence Centre ; 650, Route Des Lucioles ; F-06921 Sophia-Antipolis Cedex ; France, No. Kista; 20090814, Aug. 14, 2009, XP050356954.
International Search Report—PCT/US2009/046420—International Search Authority—European Patent Office, Apr. 8, 2010.
Qualcomm Europe S A R L: "Clarification and test results for eCall transmission with IVS initiated signalling and higher-layer acknowledgement" 3GPP Draft; S4-090484 Clarification and Test Results for Ecall Transmission With IVS Initiated Signalling and Higher-Layer Acknowledgement, 3rd Generation Partnership Project (3GPP), Mobile Competence Centre ; 650, Route Des Lucioles ; F-06921 Sophia, no. Sweden; Jun. 17, 2009, XP050356771.

(56) References Cited

OTHER PUBLICATIONS

Qualcomm Europe S A R L: "Integration of higher-layer acknowledgement message" 3GPP Draft; S4-090470 CR 26.267-0002 Integration of Higher-Layer Acknowledgement Message (Release 8), 3rd Generation Partnership Project (3GPP), Mobile Competence Centre ; 650, Route Des Lucioles ; F-06921 Sophia-Antipolis Cedex ; France, No. Sweden; Jun. 17, 2009, XP050356757.
Qualcomm Europe S A R L: "Integration of higher-layer acknowledgement message" 3GPP Draft; S4-090538 CR 26.267-0002 Rev 1 Integration of Higher-Layer Acknowledgement Message (Release 8), 3rd Generation Partnership Project (3GPP), Mobile Competence Centre ; 650, Route Des Lucioles ; F-06921 Sophia-Antipolis Cedex France, No. Sweden; Jun. 25, 2009, XP050356816.
Qualcomm Europe S A R L: "Integration of IVS-initiated signalling option" 3GPP Draft; S4-090472 CR 26.267-0003 Integration of IVS-Initiated Signalling Option (Release 8), 3rd Generation Partnership Project (3GPP), Mobile Competence Centre ; 650, Route Des Lucioles ; F-06921 Sophia-Antipolis Cedex ; France, No. Sweden; Jun. 17, 2009, XP050356759.
Qualcomm Europe: "eCall—PSAP acknowledgement to the IVS" 3GPP Draft; S1-091393, 3rd Generation Partnership Project (3GPP), Mobile Competence Centre ; 650, Route Des Lucioles ; F-06921 Sophia-Antipolis Cedex ; France, No. Chiba, Japan; May 18, 2009, XP050344830.
Suehiro N et al: "Binary signal-design for approximately synchronized CDMA systems without detection sidelobe nor co-channel interference using auto- and cross-complementary codes" International Conference on Universal Personalcommunications, IEEE, New York, NY, US, vol. 2, Oct. 5, 1998, pp. 1097-1102, XP002173807 p. 1097, last paragraph—p. 1098.

"Digital cellular telecommunications system (Phase 2+); Universal Mobile Telecommunications System (UMTS); eCall data transfer; In-band modem solution; General description (3GPP TS 26.267 version 8.0.0 Release 8)" Technical Specification, European Telecommunications Standards Institute (ETSI), 650, Route Des Lucioles ; F-06921 Sophia-Antipolis ; France, No. V8.0.0, Apr. 21, 2009, XP50370217.
Radiopriemnye ustroystva ("Radio Receiving Devices") ed. by A.P. Zhukovsky, Moscow, Vysshaya Shkola, 1989, pp. 146-148. [online], [retrieved Jul. 3, 2012], retrieved online at: <URL: http://radioustrojstva.ru/books/radio_priem_ustroystva/radio_priem_ustroystva_1.html>.
CEN TC278 WG15 (Road Traffic and Transport Telematics: "Ecall Application-Layer Acknowledgements", 3GPP Draft; S4-090508 (Attachment) LS on Ecall Hlack, 3rd Generation Partnership Project (3GPP), Mobile Competence Centre; 650, Route Des Lucioles; F-06921 Sophia-Anti Polis Cedex; France, Jun. 22, 2009, XP050638543, [retrieved on Jun. 22, 2009].
Written Opinion—PCT/US2009/046420—ISA/EPO—Aug. 4, 2010.
3GPP: "3rd Generation Partnership Project; Technical Specification Group Services and System Aspects; eCall data transfer; In-band modem solution (Release 8)", 3GPP TR 26.967 V8.0.1, Dec. 31, 2007, pp. 1-27.
Taiwan Search Report—TW098118842—TIPO—Jan. 7, 2013.
"3rd Generation Partnership Project; Technical Specification Group Services and System Aspects; eCall data transfer; In-band modem solution; General Description (Release 9)," 3GPP Standard; 3GPP TR 26.267, 3rd Generation Partnership Project (3GPP), Mobile Competence Centre, No. V9.0.0, Dec. 2009, pp. 1-36.

\* cited by examiner

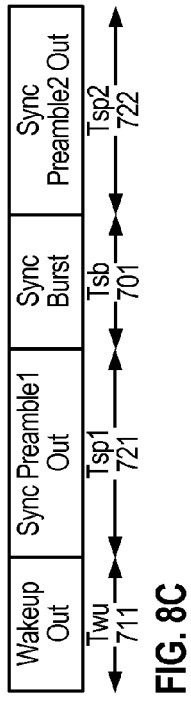
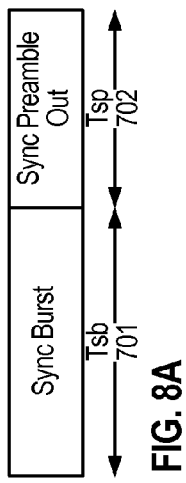
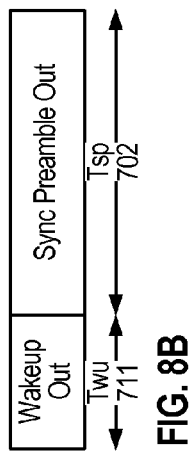
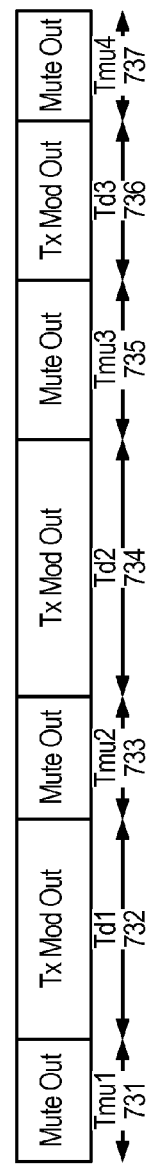
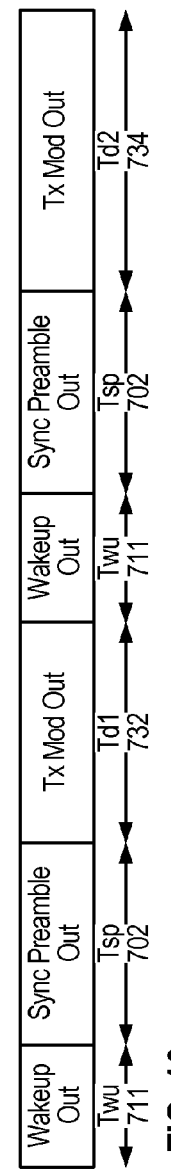

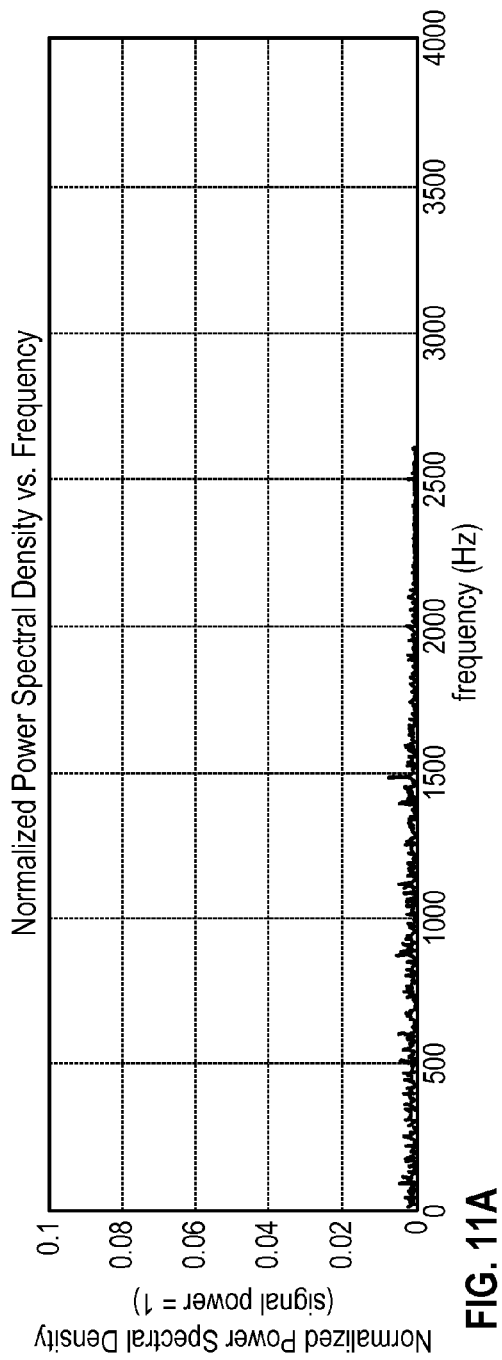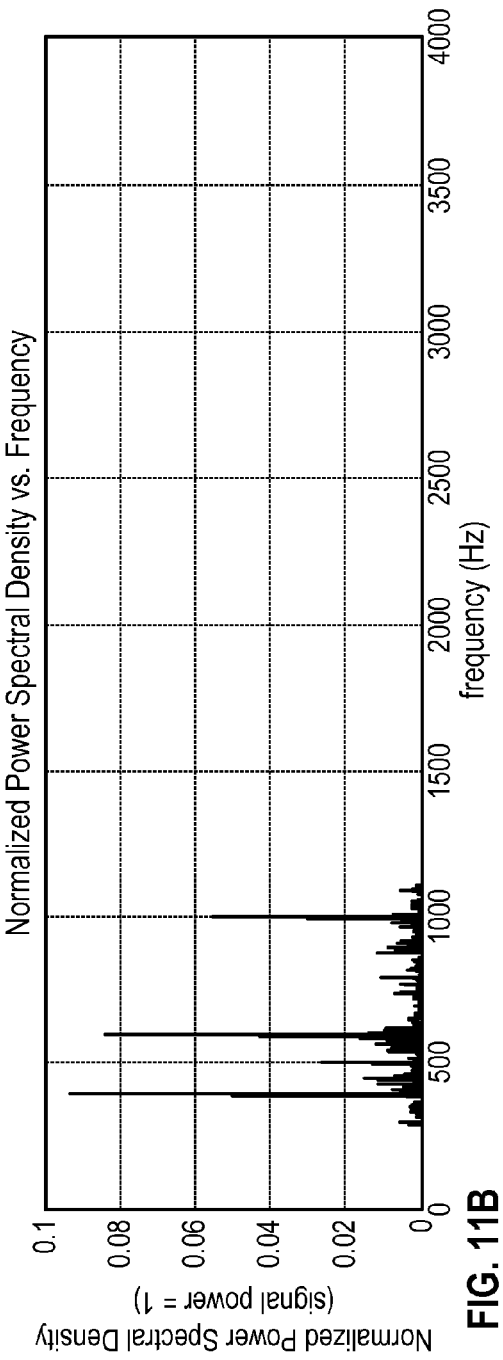

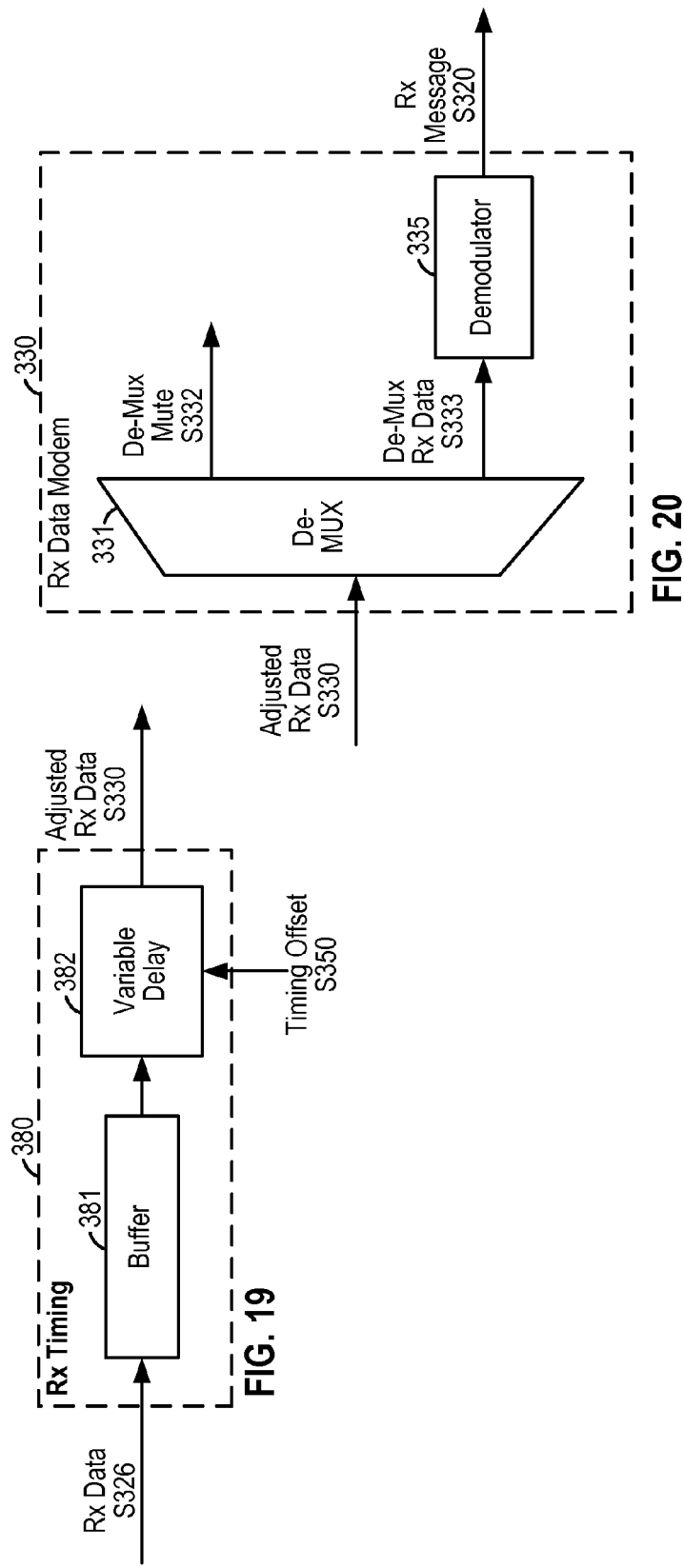

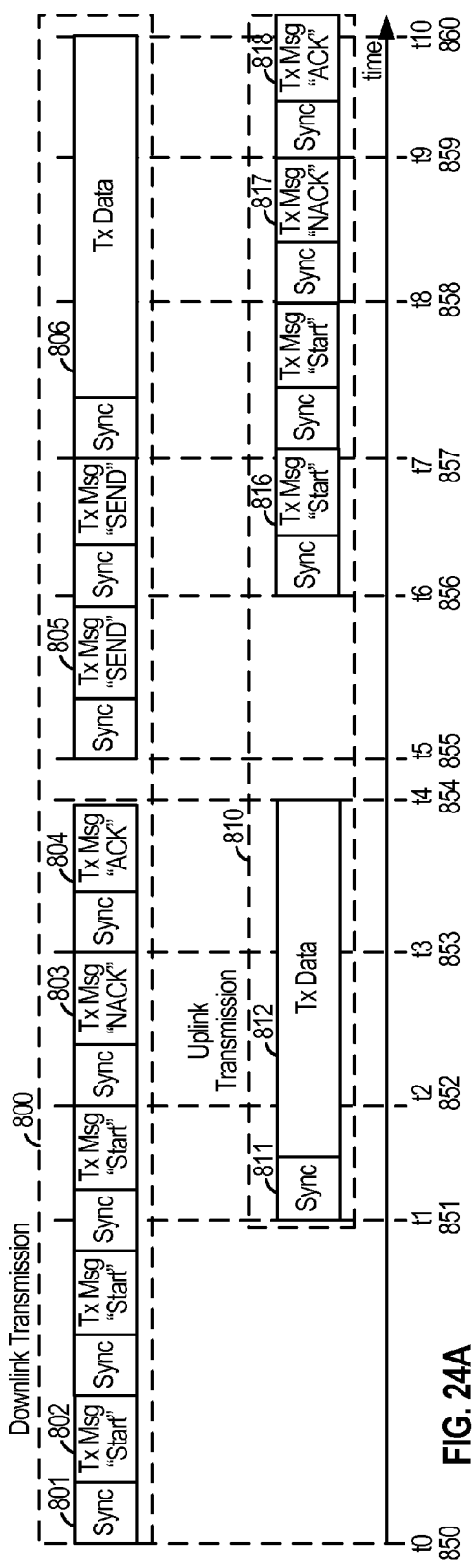
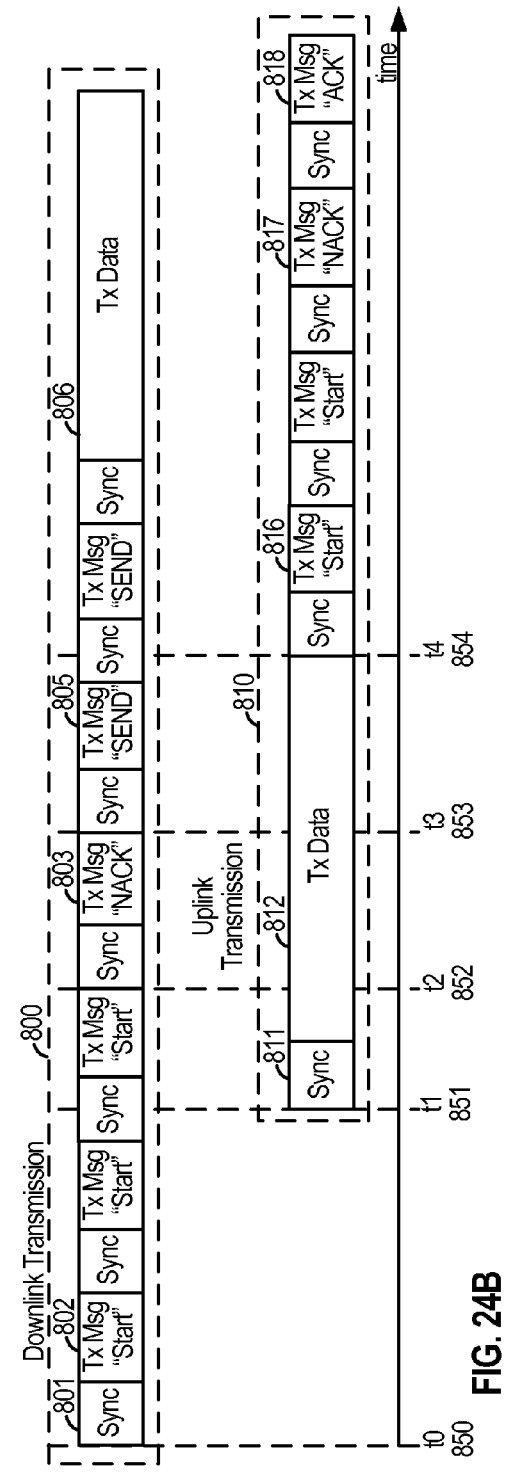
FIG. 24A
FIG. 24B

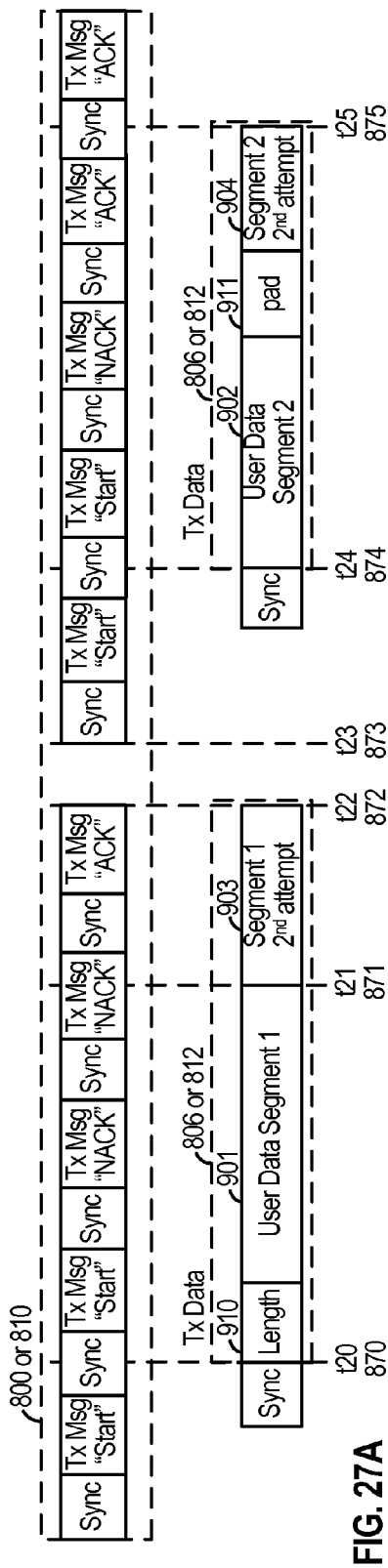
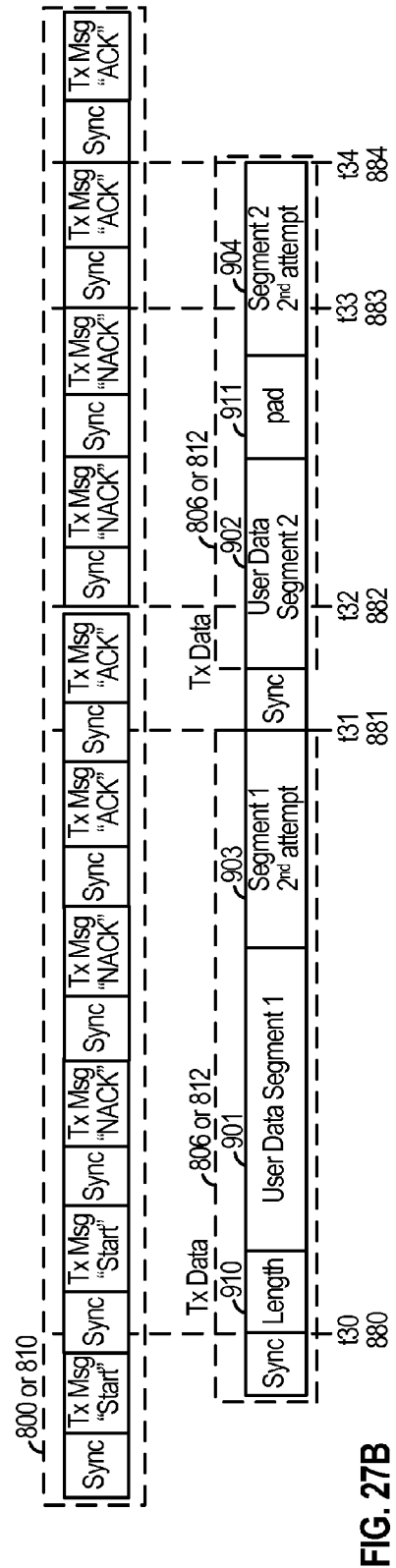
FIG. 27A
FIG. 27B

SYSTEM AND METHOD OF AN IN-BAND MODEM FOR DATA COMMUNICATIONS OVER DIGITAL WIRELESS COMMUNICATION NETWORKS

CLAIM OF PRIORITY

A claim of priority is made to the following U.S. Provisional Applications: No. 61/059,179 entitled "ROBUST SIGNAL FOR DATA TRANSMISSION OVER IN-BAND VOICE MODEM IN DIGITAL CELLULAR SYSTEMS" filed Jun. 5, 2008, and assigned to the assignee hereof and hereby expressly incorporated by reference herein; and No. 61/087,923 entitled "SYSTEM AND METHOD OF AN IN-BAND MODEM FOR DATA COMMUNICATIONS OVER DIGITAL WIRELESS (OR CELLULAR) COMMUNICATION NETWORKS" filed Aug. 11, 2008, and assigned to the assignee hereof and hereby expressly incorporated by reference herein; and No. 61/093,657 entitled "SYSTEM AND METHOD OF AN IN-BAND MODEM FOR DATA COMMUNICATIONS OVER DIGITAL WIRELESS (OR CELLULAR) COMMUNICATION NETWORKS" filed Sep. 2, 2008, and assigned to the assignee hereof and hereby expressly incorporated by reference herein; and No. 61/122,997 entitled "SYSTEM AND METHOD OF AN IN-BAND MODEM FOR DATA COMMUNICATIONS OVER DIGITAL WIRELESS (OR CELLULAR) COMMUNICATION NETWORKS" filed Dec. 16, 2008, and assigned to the assignee hereof and hereby expressly incorporated by reference herein; and No. 61/151,457 entitled "SYSTEM AND METHOD FOR PROVIDING GENERAL BIDIRECTIONAL IN-BAND MODEM FUNCTIONALITY" filed Feb. 10, 2009, and assigned to the assignee hereof and hereby expressly incorporated by reference herein; and No. 61/166,904 entitled "SYSTEM AND METHOD OF AN IN-BAND MODEM FOR DATA COMMUNICATIONS OVER DIGITAL WIRELESS (OR CELLULAR) COMMUNICATION NETWORKS" filed Apr. 6, 2009, and assigned to the assignee hereof and hereby expressly incorporated by reference herein.

RELATED APPLICATIONS

Related co-pending U.S. Patent Applications include:
"SYSTEM AND METHOD OF AN IN-BAND MODEM FOR DATA COMMUNICATIONS OVER DIGITAL WIRELESS COMMUNICATION NETWORKS", having Ser. No. 12/477,544, filed concurrently herewith, assigned to the assignee hereof, and expressly incorporated by reference herein;
"SYSTEM AND METHOD OF AN IN-BAND MODEM FOR DATA COMMUNICATIONS OVER DIGITAL WIRELESS COMMUNICATION NETWORKS", having Ser. No. 12/477,561, filed concurrently herewith, assigned to the assignee hereof, and expressly incorporated by reference herein;
"SYSTEM AND METHOD OF AN IN-BAND MODEM FOR DATA COMMUNICATIONS OVER DIGITAL WIRELESS COMMUNICATION NETWORKS", having Ser. No. 12/477,574, filed concurrently herewith, assigned to the assignee hereof, and expressly incorporated by reference herein.
"SYSTEM AND METHOD OF AN IN-BAND MODEM FOR DATA COMMUNICATIONS OVER DIGITAL WIRELESS COMMUNICATION NETWORKS", having Ser. No. 12/477,590, filed concurrently herewith, assigned to the assignee hereof, and expressly incorporated by reference herein.
"SYSTEM AND METHOD OF AN IN-BAND MODEM FOR DATA COMMUNICATIONS OVER DIGITAL WIRELESS COMMUNICATION NETWORKS", having Ser. No. 12/477,608, filed concurrently herewith, assigned to the assignee hereof, and expressly incorporated by reference herein.

BACKGROUND

1. Field

The present disclosure generally relates to data transmission over a speech channel. More specifically, the disclosure relates to transmitting non-speech information through a speech codec (in-band) in a communication network.

2. Description of Related Art

Transmission of speech has been a mainstay in communications systems since the advent of the fixed line telephone and wireless radio. Advances in communications systems research and design have moved the industry toward digital based systems. One benefit of a digital communication system is the ability to reduce required transmission bandwidth by implementing compression on the data to be transferred. As a result, much research and development has gone into compression techniques, especially in the area of speech coding. A common speech compression apparatus is a "vocoder" and is also interchangeably referred to as a "speech codec" or "speech coder." The vocoder receives digitized speech samples and produces collections of data bits known as "speech packets". Several standardized vocoding algorithms exist in support of the different digital communication systems which require speech communication, and in fact speech support is a minimum and essential requirement in most communication systems today. The $3^{rd}$ Generation Partnership Project 2 (3GPP2) is an example standardization organization which specifies the IS-95, CDMA2000 1xRTT (1x Radio Transmission Technology), CDMA2000 EV-DO (Evolution-Data Optimized), and CDMA2000 EV-DV (Evolution-Data/Voice) communication systems. The $3^{rd}$ Generation Partnership Project is another example standardization organization which specifies the GSM (Global System for Mobile Communications), UMTS (Universal Mobile Telecommunications System), HSDPA (High-Speed Downlink Packet Access), HSUPA (High-Speed Uplink Packet Access), HSPA+ (High-Speed Packet Access Evolution), and LTE (Long Term Evolution). The VoIP (Voice over Internet Protocol) is an example protocol used in the communication systems defined in 3GPP and 3GPP2, as well as others. Examples of vocoders employed in such communication systems and protocols include ITU-T G.729 (International Telecommunications Union), AMR (Adaptive Multi-rate Speech Codec), and EVRC (Enhanced Variable Rate Codec Speech Service Options 3, 68, 70).

Information sharing is a primary goal of today's communication systems in support of the demand for instant and ubiquitous connectivity. Users of today's communication systems transfer speech, video, text messages, and other data to stay connected. New applications being developed tend to outpace the evolution of the networks and may require upgrades to the communication system modulation schemes and protocols. In some remote geographical areas only speech services may be available due to a lack of infrastructure support for advanced data services in the system. Alternatively, users may choose to only enable speech services on their communications device due to economic reasons. In some countries, public services support is mandated in the communication network, such as Emergency 911 (E911) or in-vehicle emergency call (eCall). In these emergency application examples, fast data transfer is a priority but not always realistic especially when advanced data services are not available at the user terminal. Previous techniques have provided solutions to transmit data through a speech codec, but these solutions are only able to support low data rate transfers due to the coding inefficiencies incurred when trying to encode a non-speech signal with a vocoder.

The speech compression algorithms implemented by most vocoders utilize "analysis by synthesis" techniques to model the human vocal tract with sets of parameters. The sets of parameters commonly include functions of digital filter coefficients, gains, and stored signals known as codebooks to name a few. A search for the parameters which most closely match the input speech signal characteristics is performed at the vocoder's encoder. The parameters are then used at the vocoder's decoder to synthesize an estimate of the input speech. The parameter sets available to the vocoder to encode the signals are tuned to best model speech characterized by voiced periodic segments as well as unvoiced segments which have noise-like characteristics. Signals which do not contain periodic or noise-like characteristics are not effectively encoded by the vocoder and may result in severe distortion at the decoded output in some cases. Examples of signals which do not exhibit speech characteristics include rapidly changing single frequency "tone" signals or dual tone multiple frequency "DTMF" signals. Most vocoders are unable to efficiently and effectively encode such signals.

Transmitting data through a speech codec is commonly referred to as transmitting data "in-band", wherein the data is incorporated into one or more speech packets output from the speech codec. Several techniques use audio tones at predetermined frequencies within the speech frequency band to represent the data. Using predetermined frequency tones to transfer data through speech codecs, especially at higher data rates, is unreliable due to the vocoders employed in the systems. The vocoders are designed to model speech signals using a limited number of parameters. The limited parameters are insufficient to effectively model the tone signals. The ability of the vocoders to model the tones is further degraded when attempting to increase the transmission data rate by changing the tones quickly. This affects the detection accuracy and results in the need to add complex schemes to minimize the data errors which in turn further reduces the overall data rate of the communication system. Therefore, a need arises to efficiently and effectively transmit data through a speech codec in a communication network.

Accordingly it would be advantageous to provide an improved system for transmitting and receiving information through a speech codec in a communications network.

SUMMARY

Embodiments disclosed herein address the above stated needs by using an in-band modem to reliably transmit and receive non-speech information through a speech codec.

In one embodiment, a method of sending non-speech information through a speech codec comprises processing a plurality of input data symbols to produce a plurality of first pulse signals, shaping the plurality of first pulse signals to produce a plurality of shaped first pulse signals, and encoding the plurality of shaped first pulse signals with a speech codec.

In another embodiment, an apparatus comprises a processor configured to process a plurality of input data symbols to produce a plurality of first pulse signals, a shaper configured to shape the plurality of first pulse signals to produce a plurality of shaped first pulse signals, and a speech codec configured to encode the plurality of shaped first pulse signals to produce a speech packet.

In another embodiment, an apparatus comprises means for processing a plurality of input data symbols to produce a plurality of first pulse signals, means for shaping the plurality of first pulse signals to produce a plurality of shaped first pulse signals, and means for encoding the shaped first pulse signals with a speech codec.

In another embodiment, a method of synchronizing non-speech frames through a speech codec comprises generating a predetermined sequence that has noise-like characteristics and is robust to speech frame errors, and sending the predetermined sequence through a speech codec.

In another embodiment, an apparatus comprises a generator configured to generate a predetermined sequence that has noise-like characteristics and is robust to speech frame errors, and a speech codec configured to process the predetermined sequence to produce a speech packet.

In another embodiment, an apparatus comprises means for generating a predetermined sequence that has noise-like characteristics and is robust to speech frame errors, and means for sending the predetermined sequence through a speech codec.

In another embodiment, a method of obtaining non-speech data embedded in a vocoder packet comprises receiving and decoding the vocoder packet, filtering the decoded vocoder packet until a synchronization signal is detected, calculating a timing offset based on the synchronization signal, and extracting the non-speech data embedded in the decoded vocoder packet based on the timing offset.

In another embodiment, an apparatus comprises a receiver configured to receive and decode a vocoder packet, a filter configured to filter the decoded vocoder packet until a synchronization signal is detected, a calculator configured to calculate a timing offset based on the synchronization signal, and an extractor configured to extract non-speech data embedded in the decoded vocoder packet based on the timing offset.

In another embodiment, an apparatus comprises means for receiving and decoding a vocoder packet, means for filtering the decoded vocoder packet until a synchronization signal is detected, means for calculating a timing offset based on the synchronization signal, and means for extracting the non-speech data embedded in the decoded vocoder packet based on the timing offset In another embodiment, a method of controlling source terminal transmissions from a destination terminal in an in-band communication system comprises transmitting a start signal from a destination terminal, discontinuing transmission of the start signal upon detection of a first received signal, transmitting a NACK signal from the destination terminal, discontinuing transmission of the NACK signal upon detection of a successfully received source terminal data message, transmitting a ACK signal from the destination terminal, and discontinuing transmission of the ACK signal after a predetermined number of the ACK signals have been transmitted.

In another embodiment, an apparatus comprises a processor, memory in electronic communication with the processor, instructions stored in the memory, the instructions being capable of executing the steps of transmitting a start signal from a destination terminal, discontinuing transmission of the start signal upon detection of a first received signal, transmitting a NACK signal from the destination terminal, discontinuing transmission of the NACK signal upon detection of a successfully received source terminal data message, transmitting a ACK signal from the destination terminal, and discontinuing transmission of the ACK signal after a predetermined number of the ACK signals have been transmitted.

In another embodiment, an apparatus for controlling source terminal transmissions from a destination terminal in an in-band communication system comprises means for transmitting a start signal from a destination terminal, means for discontinuing transmission of the start signal upon detection of a first received signal, means for transmitting a NACK signal from the destination terminal, means for discontinuing transmission of the NACK signal upon detection of a successfully received source terminal data message, means for transmitting a ACK signal from the destination terminal, and means for discontinuing transmission of the ACK signal after a predetermined number of the ACK signals have been transmitted.

In another embodiment, a method of controlling source terminal transmissions from a source terminal in an in-band communication system comprises detecting a request signal at the source terminal, transmitting a synchronization signal from the source terminal upon detection of the request signal, transmitting a user data segment from the source terminal using a first modulation scheme, and discontinuing transmission of the user data segment upon detection of a first received signal.

In another embodiment, an apparatus comprises a processor, memory in electronic communication with the processor, instructions stored in the memory, the instructions being capable of executing the steps of detecting a request signal at a source terminal, transmitting a synchronization signal from the source terminal upon detection of the request signal, transmitting a user data segment from the source terminal using a first modulation scheme, and discontinuing transmission of the user data segment upon detection of a first received signal.

In another embodiment, an apparatus for controlling source terminal transmissions from a source terminal in an in-band communication system comprises means for detecting a request signal at the source terminal, means for transmitting a synchronization signal from the source terminal upon detection of the request signal, means for transmitting a user data segment from the source terminal using a first modulation scheme, and means for discontinuing transmission of the user data segment upon detection of a first received signal.

In another embodiment, a method of controlling bidirectional data transmissions from a destination terminal in an in-band communication system comprises transmitting a send signal from the destination terminal, discontinuing transmission of the send signal upon detection of a first received signal, transmitting a synchronization signal from the destination terminal, transmitting a user data segment from the destination terminal using a first modulation scheme, and discontinuing transmission of the user data segment upon detection of a second received signal.

In another embodiment, an apparatus comprises a processor, memory in electronic communication with the processor, instructions stored in the memory, the instructions being capable of executing the steps of transmitting a send signal from the destination terminal, discontinuing transmission of the send signal upon detection of a first received signal, transmitting a synchronization signal from the destination terminal, transmitting a user data segment from the destination terminal using a first modulation scheme, and discontinuing transmission of the user data segment upon detection of a second received signal.

In another embodiment, an apparatus for controlling bidirectional data transmissions from a destination terminal in an in-band communication system comprises means for transmitting a send signal from the destination terminal, means for discontinuing transmission of the send signal upon detection of a first received signal, means for transmitting a synchronization signal from the destination terminal, means for transmitting a user data segment from the destination terminal using a first modulation scheme, and means for discontinuing transmission of the user data segment upon detection of a second received signal.

In another embodiment, a system for communicating data over an in-band communication system from a vehicle containing an in-vehicle system (IVS) to a public safety answering point (PSAP) comprises one or more sensors located in the IVS for providing IVS sensor data, an IVS transmitter located in the IVS for transmitting the IVS sensor data, a PSAP receiver located in the PSAP for receiving the IVS sensor data, a PSAP transmitter located in the PSAP for transmitting PSAP command data, an IVS receiver located in the IVS for receiving the PSAP command data; wherein the IVS transmitter comprises an IVS message formatter for formatting the IVS sensor data and producing an IVS message, an IVS processor for processing the IVS message and producing a plurality of IVS shaped pulse signals, an IVS speech encoder for encoding the IVS shaped pulse signals and producing an IVS encoded signal, an IVS synchronization generator for generating an IVS synchronization signal, and an IVS transmit controller for transmitting a sequence of IVS synchronization signals and IVS messages; wherein the PSAP receiver comprises a PSAP detector for detecting the IVS synchronization signal and producing a PSAP sync flag, a PSAP demodulator for demodulating the IVS message and producing a received IVS message; wherein the PSAP transmitter comprises a PSAP message formatter for formatting the PSAP command data and producing a PSAP command message, a PSAP processor for processing the PSAP command message and producing a plurality of PSAP shaped pulse signals, a PSAP speech encoder for encoding the PSAP shaped pulse signals and producing a PSAP encoded signal, a PSAP synchronization generator for generating a PSAP synchronization signal, and a PSAP transmit controller for transmitting a sequence of PSAP synchronization signals and PSAP command messages; wherein the IVS receiver comprises an IVS detector for detecting the PSAP synchronization signal and producing an IVS sync flag, and an IVS demodulator for demodulating the PSAP messages and producing a received PSAP message.

BRIEF DESCRIPTION OF THE DRAWINGS

The aspects and the attendant advantages of the embodiments described herein will become more readily apparent by reference to the following detailed description when taken in conjunction with the accompanying drawings wherein:

FIG. 8A is a diagram of an embodiment of a synchronization message format.

FIG. 8B is a diagram of another embodiment of a synchronization message format.

FIG. 8C is a diagram of yet another embodiment of a synchronization message format.

FIG. 9 is a diagram of an embodiment of a transmit data message format.

FIG. 10 is a diagram of an embodiment of a composite synchronization and transmit data message format.

FIG. 11A is a graph of the power spectral density of an in-band pulse based signal versus frequency.

FIG. 11B is a graph of the power spectral density of an in-band tone based signal versus frequency.

FIG. 19 is a diagram of an embodiment of a receive timing adjuster.

FIG. 20 is a diagram of an embodiment of a receive data modem used in an in-band communication system.

FIG. 24A is a diagram of an embodiment of an interaction of a bi-directional data request sequence and data response sequence transmitted on both the downlink and uplink.

FIG. 24B is a diagram of another embodiment of an interaction of a bi-directional data request sequence and data response sequence transmitted on both the downlink and uplink.

FIG. 27A is a diagram of an embodiment of an interaction of the transmit data request sequence and transmit data response sequence, wherein the user data length is greater than the transmit packet size.

FIG. 27B is a diagram of another embodiment of an interaction of the transmit data request sequence and transmit data response sequence, wherein the user data length is greater than the transmit packet size.

DETAILED DESCRIPTION

Figure 1:
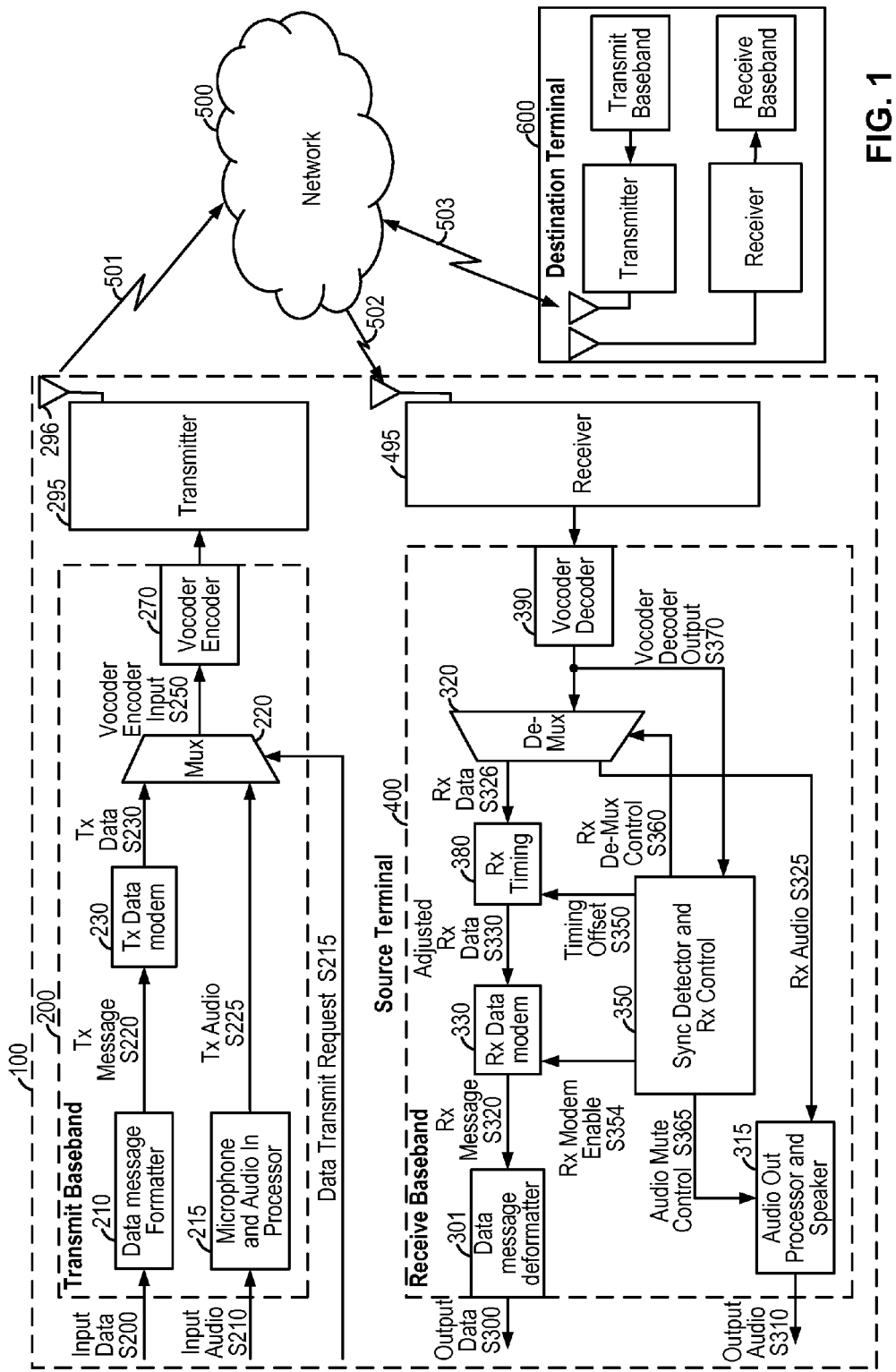
FIG. 1 is a diagram of an embodiment of source and destination terminals which use an in-band modem to transmit data through a speech codec in a wireless communication network.

FIG. 1 shows an embodiment of an in-band data communication system as might be implemented within a wireless source terminal 100. The source terminal 100 communicates with the destination terminal 600 through the communication channels 501 and 502, network 500, and communication channel 503. Examples of suitable wireless communication systems include cellular telephone systems operating in accordance with Global System for Mobile Communication (GSM), Third Generation Partnership Project Universal Mobile Telecommunication System (3GPP UMTS), Third Generation Partnership Project 2 Code Division Multiple Access (3GPP2 CDMA), Time Division Synchronous Code Division Multiple Access (TD-SCDMA), and Worldwide Interoperability for Microwave Access (WiMAX) standards. One skilled in the art will recognize that the techniques described herein may be equally applied to an in-band data communication system that does not involve a wireless channel. The communication network 500 includes any combination of routing and/or switching equipment, communications links and other infrastructure suitable for establishing a communication link between the source terminal 100 and destination terminal 600. For example, communication channel 503 may not be a wireless link. The source terminal 100 normally functions as a voice communication device.

Transmitter

The transmit baseband 200 normally routes user speech through a vocoder, but is also capable of routing non-speech data through the vocoder in response to a request originating from the source terminal or the communication network. Routing non-speech data through the vocoder is advantageous since it eliminates the need for the source terminal to request and transmit the data over a separate communications channel. The non-speech data is formatted into messages. The message data, still in digital form, is converted into a noise-like signal comprised of shaped pulses. The message data information is built into the pulse positions of the noise-like signal. The noise-like signal is encoded by the vocoder. The vocoder is not configured differently depending on whether the input is user speech or non-speech data so it is advantageous to convert the message data into a signal which can be effectively encoded by the transmission parameter set allocated to the vocoder. The encoded noise-like signal is transmitted in-band over the communication link. Because the transmitted information is built in the pulse positions of the noise-like signal, reliable detection depends on recovery of the timing of the pulses relative to the speech codec frame boundaries. To aid the receiver in detecting the in-band transmission, a predetermined synchronization signal is generated and encoded by the vocoder prior to the transmission of message data. A protocol sequence of synchronization, control, and messages is transmitted to ensure reliable detection and demodulation of the non-speech data at the receiver.

Referring to the transmit baseband 200, the signal input audio S210 is input to the microphone and audio input processor 215 and transferred through the mux 220 into the vocoder encoder 270 where compressed voiced packets are generated. A suitable audio input processor typically includes circuitry to convert the input signal into a digital signal and a signal conditioner to shape the digital signal such as a low-pass filter. Examples of suitable vocoders include those described by the following reference standards: GSM-FR, GSM-HR, GSM-EFR, EVRC, EVRC-B, SMV, QCELP13K, IS-54, AMR, G.723.1, G.728, G.729, G.729.1, G.729a, G.718, G.722.1, AMR-WB, EVRC-WB, VMR-WB. The vocoder encoder 270 supplies voice packets to the transmitter 295 and antenna 296 and the voice packets are transmitted over the communication channel 501.

A request for data transmission may be initiated by the source terminal or through the communications network. The data transmit request S215 disables the voice path through mux 220 and enables the transmit data path. The input data S200 is pre-processed by the data message formatter 210 and output as Tx Message S220 to the Tx Data Modem 230. Input data S200 may include user interface (UI) information, user position/location information, time stamps, equipment sensor information, or other suitable data. An example of a suitable data message formatter 210 includes circuitry to calculate and append cyclic redundancy check (CRC) bits to the input data, provide retransmission buffer memory, implement error control coding such as hybrid automatic repeat-request (HARQ), and interleave the input data. The Tx data modem 230 converts Tx Message S220 to data signal Tx Data S230 which is routed through mux 220 to the vocoder encoder 270. Once the data transmission is complete the voice path may be re-enabled through mux 220.

Figure 2:
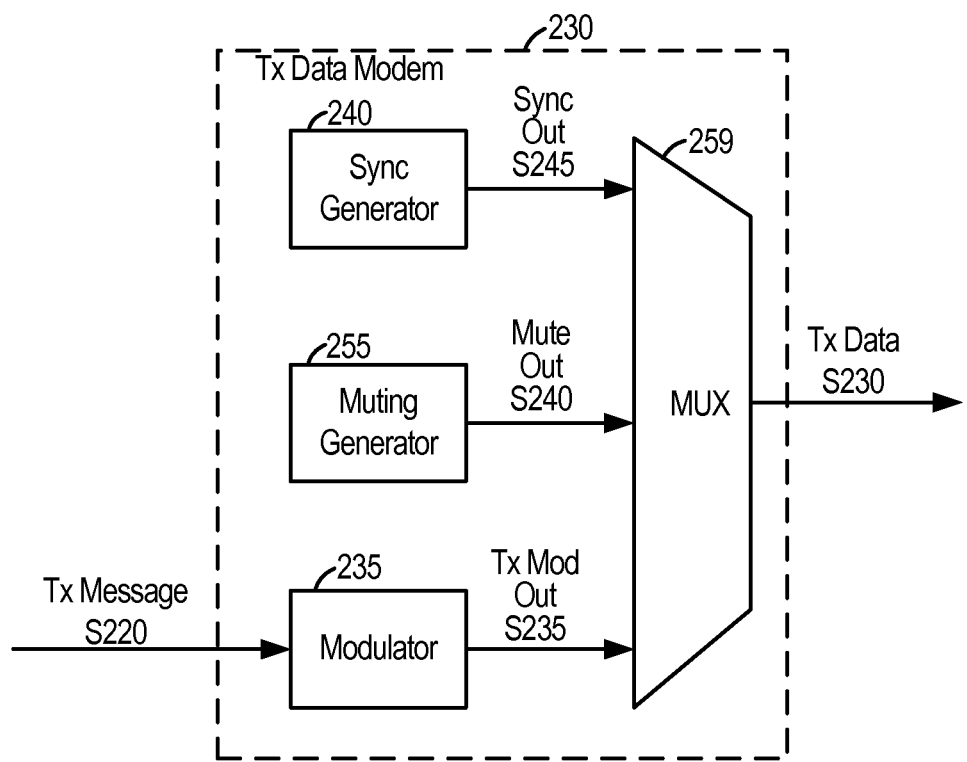
FIG. 2 is a diagram of an embodiment of a transmit data modem used in an in-band communication system.

FIG. 2 is a suitable example block diagram of the Tx data modem 230 shown in FIG. 1. Three signals may be multiplexed in time through mux 259 onto the Tx data S230 output signal; Sync Out S245, Mute Out S240, and Tx Mod Out S235. It should be recognized that different orders and combinations of signals Sync Out S245, Mute Out S240, and Tx Mod Out S235 may be output onto Tx data S230. For example, Sync Out S245 may be sent prior to each Tx Mod Out S235 data segment. Or, Sync Out S245 may be sent once prior to a complete Tx Mod Out S235 with mute Out S240 sent between each Tx Mod Out S235 data segment.

Figure 3A:
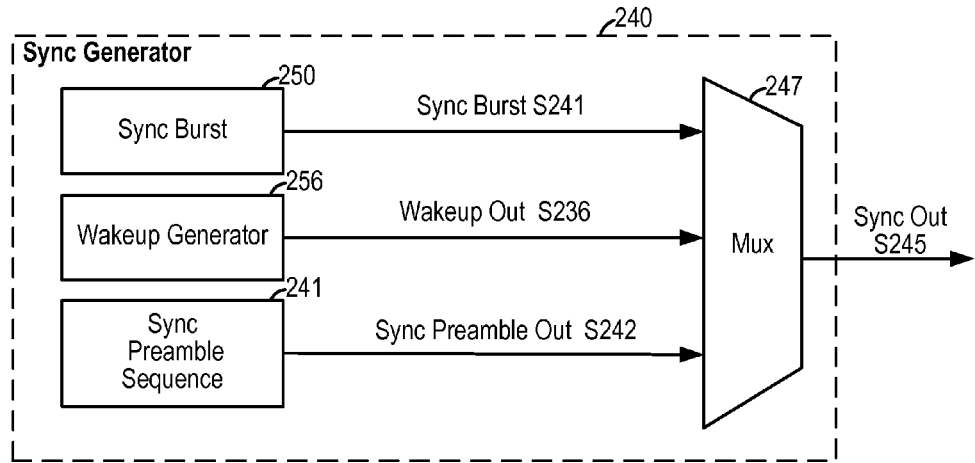
FIG. 3A is a diagram of an embodiment of a synchronization signal generator.
Figure 3B:
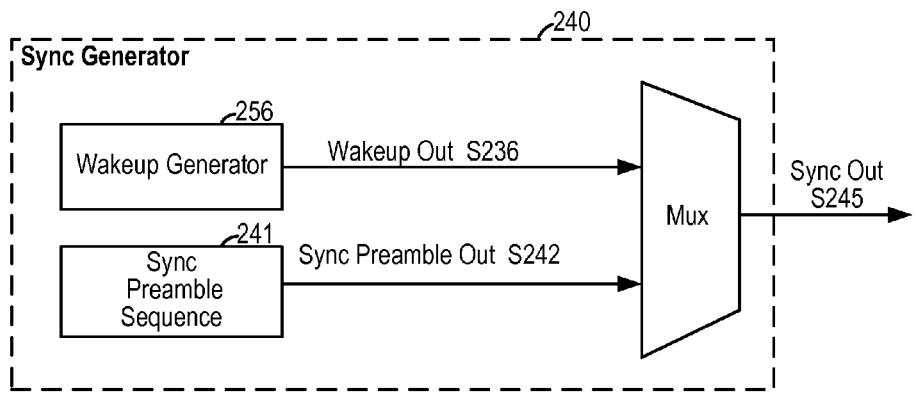
FIG. 3B is a diagram of another embodiment of a synchronization signal generator.
Figure 3C:
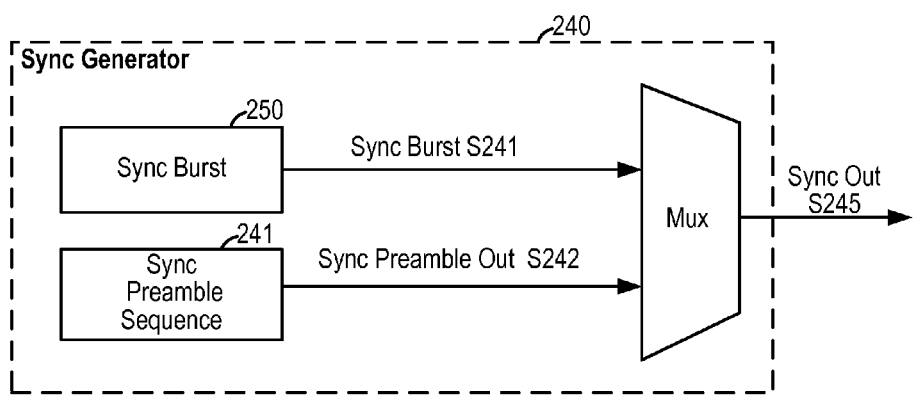
FIG. 3C is a diagram of yet another embodiment of a synchronization signal generator.

Sync Out S245 is a synchronization signal used to establish timing at the receiving terminal. Synchronization signals are required to establish timing for the transmitted in-band data since the data information is built in the pulse positions of the noise-like signal. FIG. 3A shows a suitable example block diagram of the Sync Generator 240 shown in FIG. 2. Three signals may be multiplexed in time through mux 247 onto the Sync Out S245 signal; Sync Burst S241, Wakeup Out S236, and Sync Preamble Out S242. It should be recognized that different orders and combinations of Sync Burst S241, Wakeup Out S236, and Sync Preamble Out S242 may be output onto Sync Out S245. For example, FIG. 3B shows a Sync Generator 240 comprised of Wakeup Out S236 and Sync Preamble Out S242 where Wakeup Out S236 may be sent prior to each Sync Preamble Out S242. Alternatively, FIG. 3C shows a Sync Generator 240 comprised of Sync Burst S241 and Sync Preamble Out S242 where Sync Burst S241 may be sent prior to each Sync Preamble Out S242.

Figure 4:
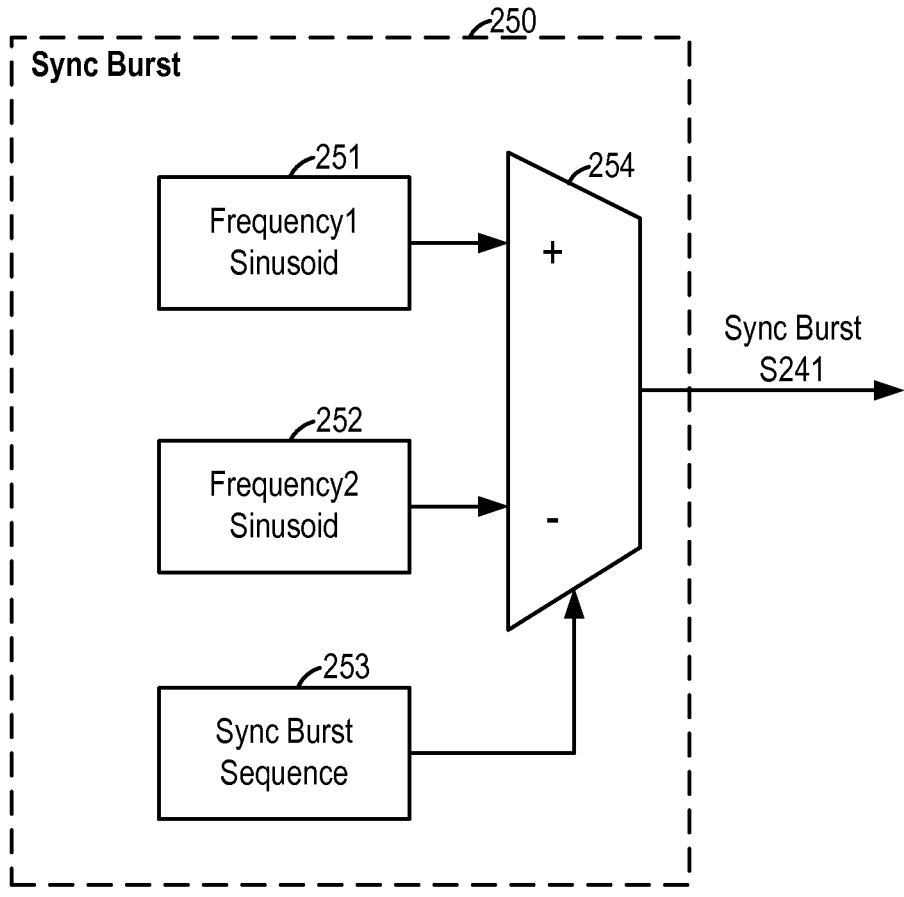
FIG. 4 is a diagram of an embodiment of a synchronization burst generator.
Figure 5:
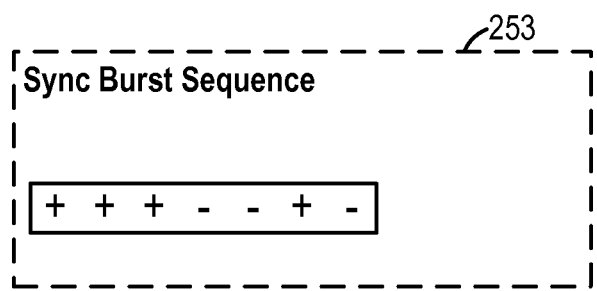
FIG. 5 is a diagram of an embodiment of a synchronization burst sequence.

Referring back to FIG. 3A, Sync Burst S241 is used to establish coarse timing at the receiver and is comprised of at least one sinusoidal frequency signal having a predetermined sampling rate, sequence, and duration and is generated by Sync Burst 250 shown in FIG. 4. Sinusoidal Frequency1 251 represents binary data +1 and Frequency2 252 represents binary data −1. Examples of suitable signals include constant frequency sinusoids in the voice band, such as 395 Hz, 540 Hz, and 512 Hz for one sinusoidal signal and 558 Hz, 1035 Hz, and 724 Hz for the other sinusoidal signal. The Sync Burst Sequence 253 determines which frequency signal is multiplexed through mux 254. The information sequence modulated onto the synchronization burst should be one with good autocorrelation properties. An example of a suitable Sync Burst Sequence 253 is the Barker code of length 7 shown in FIG. 5. For each '+' symbol, Frequency1 Sinusoid is output on Sync Burst S241, and for each '−' symbol, Frequency2 Sinusoid is output.

Referring back to FIG. 3A, Sync Preamble Out S242 is used to establish fine (sample based) timing at the receiver and is comprised of a predetermined data pattern known at the receiver. A suitable example of a Sync Preamble Out S242 predetermined data pattern is Sync Preamble Sequence 241 shown in FIG. 6A. The composite preamble sequence 245 is generated by concatenating several periods of a pseudorandom noise (PN) sequence 242 with an overlapped and added result of the PN sequence 242 and an inverted version of the PN sequence 244. The '+' symbols in the composite preamble sequence 245 represent binary data +1 and the '−' symbols represent binary data −1. Another suitable example inserts zero valued samples between the data bits of the PN sequence. This provides temporal distance between the data bits to account for "smearing" affects caused by the bandpass filter characteristics of the channel which tends to spread the energy of the data bit over several bit time intervals.

The previously described construction of the sync preamble using concatenated periods of a PN sequence with overlapped segments of inverted versions of the PN sequence provides advantages in reduced transmission time, improved correlation properties, and improved detection characteristics. The advantages result in a preamble which is robust to speech frame transmission errors.

By overlapping the PN segments, the resultant composite sync preamble consists of a smaller number of bits in the sequence compared to a non-overlapped version, thereby decreasing the total time required to transmit the composite preamble sequence 245.

Figure 6A:
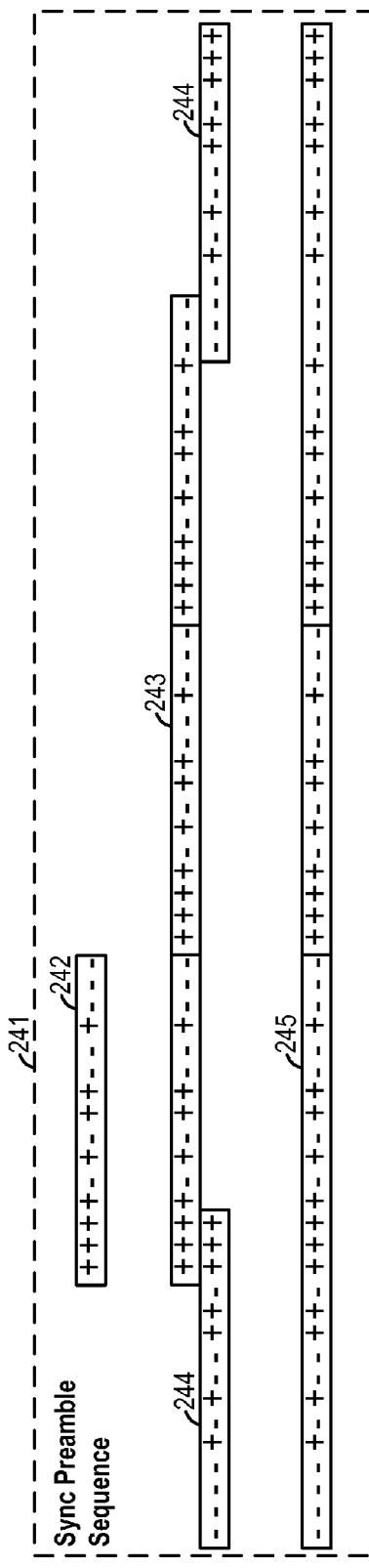
FIG. 6A is a diagram of an embodiment of a synchronization preamble sequence.
Figure 6B:
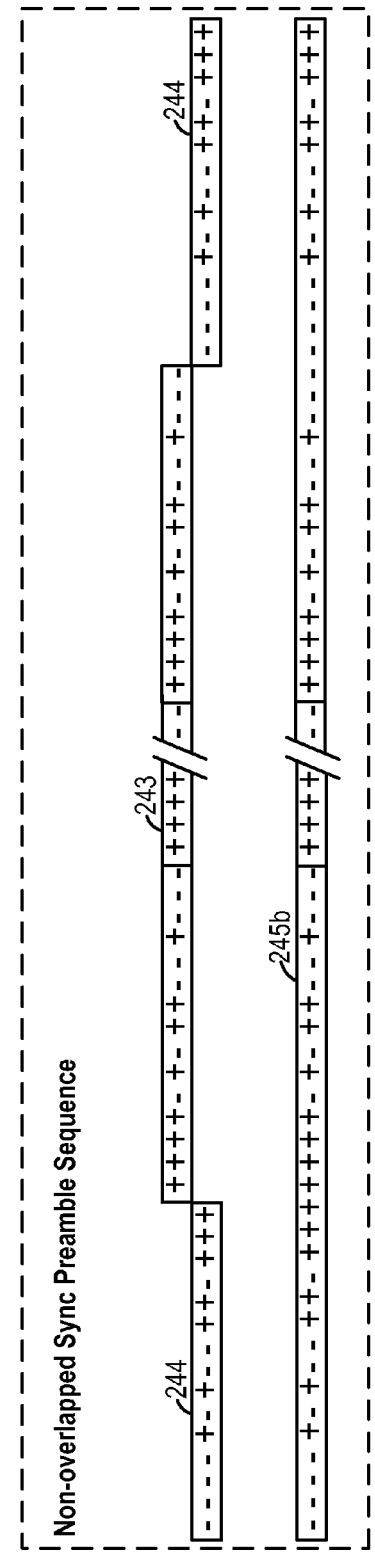
FIG. 6B is a diagram of an embodiment of a synchronization preamble sequence with non-overlapping reference sequences.
Figure 7A:
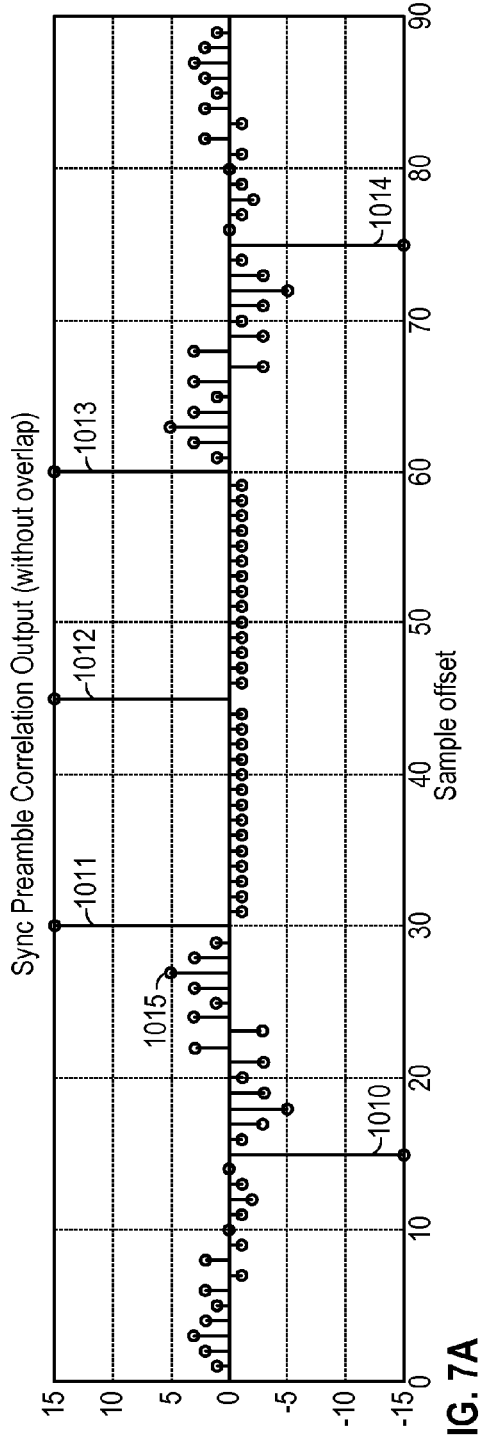
FIG. 7A is a graph of a synchronization preamble correlation output where the preamble is comprised of non-overlapped reference sequences.
Figure 7B:
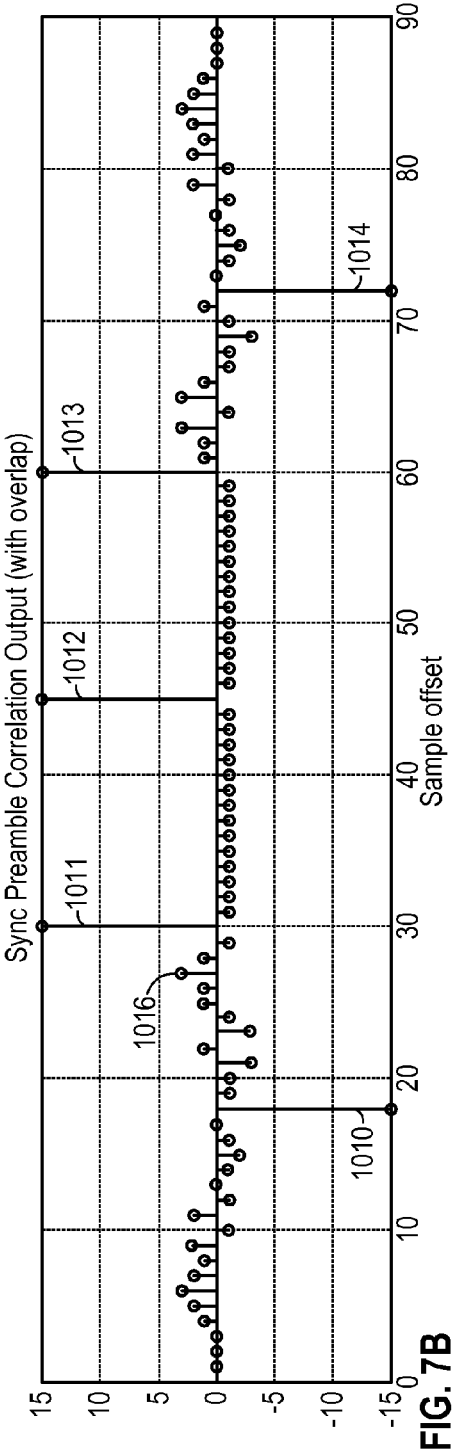
FIG. 7B is a graph of a synchronization preamble correlation output where the preamble is comprised of overlapped reference sequences.

To illustrate the improvements in the correlation properties of the overlapped sync preamble, FIG. 7A and FIG. 7B show a comparison between the correlation of PN sequence 242 with a non-overlapped composite preamble sequence 245b, shown in FIG. 6B and the correlation of PN sequence 242 with the overlapped composite sync preamble sequence 245, shown in FIG. 6A. FIG. 7A shows the main correlation peaks, both positive and negative, as well as the minor correlation peaks located between the main peaks for the non-overlapped composite sync preamble sequence 245b. The negative peak 1010 results from the correlation of the PN sequence 242 with the first inverted segment of the non-overlapped composite preamble sequence 245b. The positive correlation peaks 1011, 1012, 1013, result from the correlation of the PN sequence 242 with the three concatenated segments of PN sequence 242 which make up the middle section of the non-overlapped composite preamble sequence 245b. The negative peak 1014 results from the correlation of the PN sequence 242 with the second inverted segment of the non-overlapped composite preamble sequence 245b. In FIG. 7A, the minor correlation peak 1015, corresponding to an offset of 3 samples from the first positive correlation peak 1011 shows a magnitude of approximately 5 ($\frac{1}{3}^{rd}$ the magnitude of the main peaks). FIG. 7B shows several main correlation peaks, both positive and negative, as well as the minor correlation peaks between the main peaks for the overlapped composite sync preamble sequence 245. In FIG. 7B, the minor correlation peak 1016, corresponding to an offset of 3 PN samples from the first positive correlation peak 1011 shows a magnitude of approximately 3 ($\frac{1}{5}^{th}$ the magnitude of the main peaks). The smaller magnitude of the minor correlation peak 1016 for the overlapped preamble shown in FIG. 7B results in less false detections of the preamble main correlation peaks when compared to the non-overlapped minor peak 1015 example shown in FIG. 7A.

As shown in FIG. 7B, five major peaks are generated when correlating PN sequence 242 with the composite sync preamble sequence 245. The pattern shown (1 negative peak, 3 positive peaks, and 1 negative peak) allows for determining the frame timing based on any 3 detected peaks and the corresponding temporal distances between the peaks. The combination of 3 detected peaks with the corresponding temporal distance is always unique. A similar depiction of the correlation peak pattern is shown in Table 1, where the correlation peaks are referenced by a '−' for a negative peak and a '+' for a positive peak. The technique of using a unique correlation peak pattern is advantageous for in-band systems since the unique pattern compensates for possible speech frame losses, for example, due to poor channel conditions. Losing a speech frame may result in losing a correlation peak as well. By having a unique pattern of correlation peaks separated by predetermined temporal distances, a receiver can reliably detect the sync preamble even with lost speech frames which result in lost correlation peaks. Several examples are shown in Table 2 for the combinations of 3 detected peaks in the pattern (2 peaks are lost in each example). Each entry in Table 2, represents a unique pattern of peaks and temporal distances between the peaks. Example 1 in Table 2 shows detected peaks 3, 4, and 5 (peaks 1 and 2 were lost), resulting in the pattern '+ + −' with one predetermined distance between each peak. Examples 2 and 3 in Table 2 also show the pattern '+ + −', however the distances are different. Example 2 has two predetermined distances between detected peak 2 and 4, while Example 3 has two predetermined distances between detected peak 3 and 5. So Examples 1, 2 and 3 each represent a unique pattern from which the frame timing may be derived. It should be recognized that the detected peaks may extend across frame boundaries, but that the unique patterns and predetermined distances still apply.

TABLE 1

|  | Correlation Peak Number | | | | |
|---|---|---|---|---|---|
|  | 1 | 2 | 3 | 4 | 5 |
| Correlation Peak Polarity | − | + | + | + | − |

TABLE 2

|  |  | Correlation Peak Number | | | | |
|---|---|---|---|---|---|---|
|  |  | 1 | 2 | 3 | 4 | 5 |
| Detected Correlation Peaks | Example 1 |  |  | + | + | − |
|  | Example 2 |  | + |  | + | − |
|  | Example 3 |  | + | + |  | − |
|  | Example 4 |  | + | + | + |  |
|  | Example 5 | − |  |  | + | − |
|  | Example 6 | − |  | + |  | − |
|  | Example 7 | − |  | + | + |  |
|  | Example 8 | − | + |  |  | − |
|  | Example 9 | − | + |  | + |  |
|  | Example 10 | − | + | + |  |  |

One skilled in the art will recognize that a different preamble sequence resulting in a different correlation peak pattern to that shown in FIG. 7B and Table 1 may be used. One skilled in the art will also recognize that multiple correlation peak patterns may be used to identify different operational modes or transmit information bits. An example of an alternate correlation peak pattern is shown in Table 3. The correlation peak pattern shown in Table 3 maintains a unique pattern from which the frame timing may be derived, as described previously. Having multiple correlation peak patterns is advantageous for identifying different transmitter configurations at the receiver, such as message formats or modulation schemes.

TABLE 3

|  | Correlation Peak Number | | | | |
|---|---|---|---|---|---|
|  | 1 | 2 | 3 | 4 | 5 |
| Correlation Peak Polarity | + | − | − | − | + |

Referring again to FIG. 3A, Wakeup Out S236 is used to trigger the vocoder encoder 270 to wake up from a sleep state, low transmission rate state, or discontinuous transmission state. Wakeup Out S236 may also be used to prohibit the vocoder encoder 270 from entering the sleep, low transmission, or discontinuous transmission state. Wakeup Out S236 is generated by Wakeup Generator 256. Wakeup signals are advantageous when transmitting in-band data through vocoders which implement sleep, discontinuous transmit functions (DTX), or operate at a lower transmission rate during inactive voice segments to minimize the startup delay which may occur in transitioning from the voice inactive state to the voice active state. Wakeup signals may also be used to identify a characteristic of the transmission mode; for example, the type of modulation scheme employed. A first example of a suitable Wakeup Out S236 signal is a single sinusoidal signal of constant frequency in the voice band, such as 395 Hz. In this first example, the Wakeup signal prohibits the vocoder encoder 270 from entering the sleep, DTX, or low rate state. In this first example, the receiver ignores the transmitted Wakeup Out signal S236. A second example of a suitable Wakeup Out S236 is a signal comprised of multiple sinusoidal signals with each signal identifying a specific data modulation scheme, for example 500 Hz for modulation scheme 1 and 800 Hz for modulation scheme 2. In this second example, the Wakeup signal prohibits the vocoder encoder 270 from entering the sleep, DTX, or low rate state. In this second example, the receiver uses the transmitted Wakeup Out signal S236 to identify the data modulation scheme.

An example of a composite Sync Out S245 signal is one comprised of a multiplexed Sync Burst S241 and Sync Preamble Out S242 as shown in FIG. 8A. Tsb 701 and Tsp 702 represent the durations in time each signal is transmitted. An example of a suitable range for Tsb is 120-140 milliseconds and Tsp is 40-200 milliseconds. Another example of a composite Sync Out S245 signal is one comprised of a multiplexed Wakeup Out S236 and Sync Preamble Out S242 as shown in FIG. 8B. Twu 711 and Tsp 702 represent the durations in time each signal is transmitted. An example of a suitable range for Twu is 10-60 milliseconds and Tsp is 40-200 milliseconds. Another example of a composite Sync Out S245 signal is one comprised of a multiplexed Wakeup Out S236, Sync Burst S241, and Sync Preamble Out S242 as shown in FIG. 8C. Twu 711, Tsp1 721, Tsb 701, Tsp2 722 represent the durations in time each signal is transmitted. An example of a suitable range for Twu is 20-80 milliseconds, Tsp1 is 40-200 milliseconds, Tsb is 120-140 milliseconds, and Tsp2 is 40-200 milliseconds.

Referring back to FIG. 2, a suitable example of Tx Mod Out S235 is a signal generated by the Modulator 235 using pulse-position modulation (PPM) with special modulation pulse shapes. This modulation technique results in low distortion when encoded and decoded by different types of vocoders. Additionally, this technique results in good autocorrelation properties and can be easily detected by a receiver matched to the waveform. Further, the shaped pulses do not have a tonal structure; instead the signals appear noise-like in the frequency spectrum domain as well as retain a noise-like audible characteristic. An example of the power spectral density of a signal based on shaped pulses is shown in FIG. 1A. As can be seen in FIG. 1A, the power spectral density displays a noise-like characteristic over the in-band frequency range (constant energy over the frequency range). Conversely, an example of the power spectral density of a signal with a tonal structure is shown in FIG. 11B, where the data is represented by tones at frequencies approximately 400 Hz, 600 Hz, and 1000 Hz. As can be seen in FIG. 11B, the power spectral density displays "spikes" of significant energy over the in-band frequency range at the tone frequencies and its harmonics.

Figure 12:
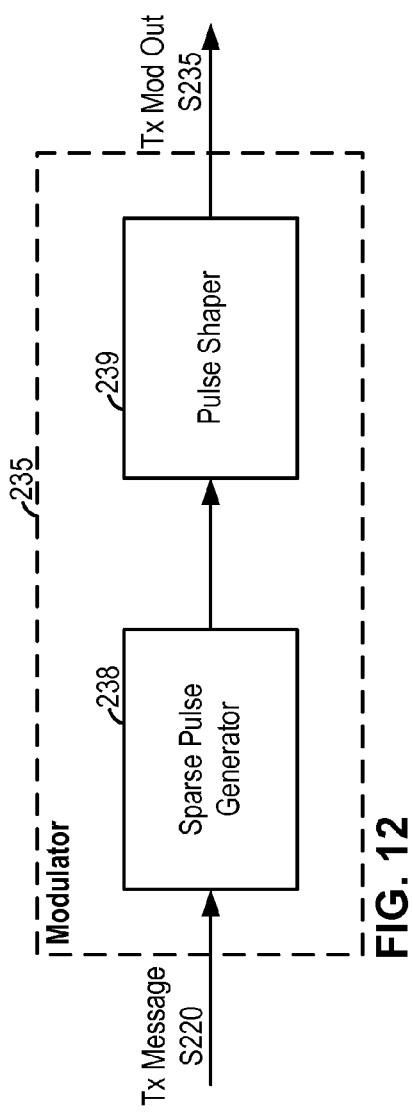
FIG. 12 is a diagram of an embodiment of a data modulator using sparse pulses.
Figure 13:
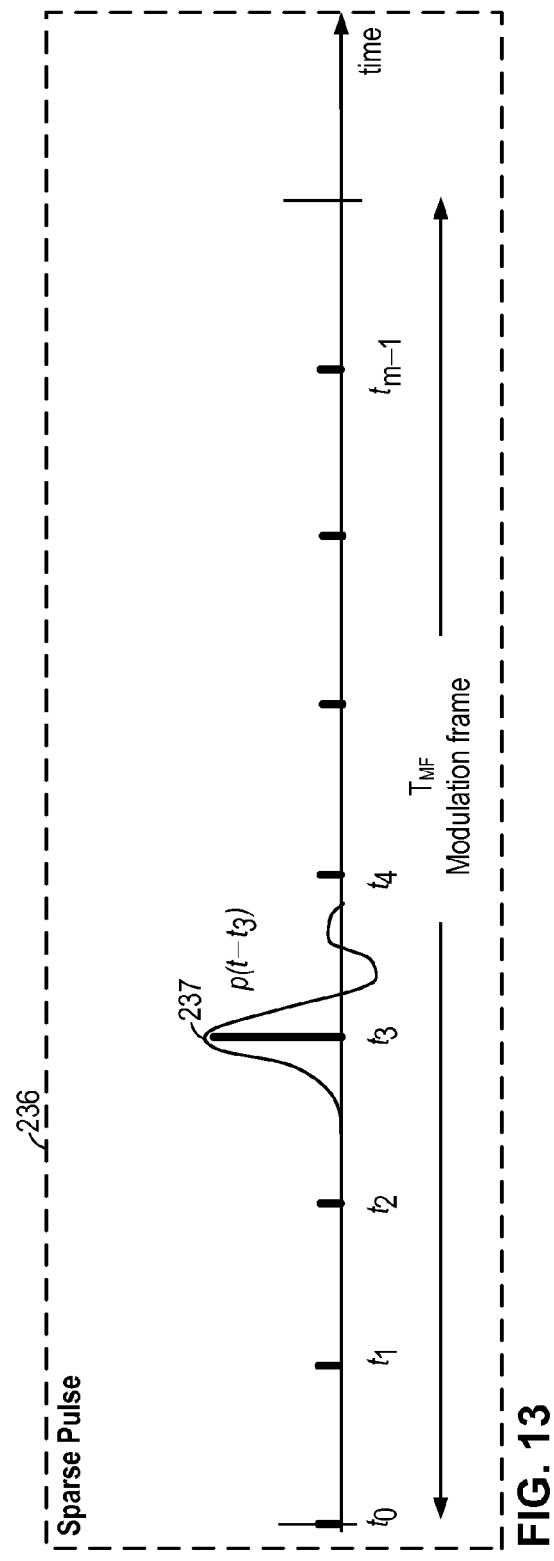
FIG. 13 is a diagram of an embodiment of a sparse pulse data symbol representation.

FIG. 12 is an example block diagram of the Modulator 235 shown in FIG. 2. The Sparse Pulse Generator 238 produces pulses corresponding to input Tx Message S220 using pulse position modulation and then the Pulse Shaper 239 shapes the pulses to create the signal for better coding quality in the vocoder encoder. A suitable example of a Sparse Pulse is shown in FIG. 13. The time axis is divided into modulation frames of duration $T_{MF}$. Within each such modulation frame, a number of time instances $t_0, t_1, \ldots, t_{m-1}$ are defined relative to the modulation frame boundary, which identify potential positions of a basic pulse p(t). For example, the Pulse 237 at position $t_3$ is denoted as $p(t-t_3)$. The Tx Message S220 information bits input to the Modulator 235 are mapped to symbols with corresponding translation to pulse positions according to a mapping table. The pulse may also be shaped with a polarity transform, ±p(t). The symbols may therefore be represented by one of 2m distinct signals within the modulation frame where m represents the number of time instances defined for the modulation frame and the multiplication factor, 2, represents the positive and negative polarity.

An example of a suitable pulse position mapping is shown in Table 4. In this example, the modulator maps a 4-bit symbol for each modulation frame. Each symbol is represented in terms of the position k of the pulse shape p(n−k) and the sign of the pulse. In this example, $T_{MF}$ is 4 milliseconds resulting in 32 possible positions for an 8 KHz sample rate. The pulses are separated by 4 time instances resulting in the assignment of 16 different pulse position and polarity combinations. In this example, the effective data rate is 4 bits per symbol in a 4 millisecond period or 1000 bits/second.

TABLE 4

| Symbol | | Pulse |
|---|---|---|
| decimal | binary | |
| 0 | 0000 | p(n − 0) |
| 1 | 0001 | p(n − 4) |
| 2 | 0010 | p(n − 8) |
| 3 | 0011 | p(n − 12) |
| 4 | 0100 | p(n − 16) |
| 5 | 0101 | p(n − 20) |
| 6 | 0110 | p(n − 24) |
| 7 | 0111 | p(n − 28) |
| 8 | 1000 | −p(n − 28) |
| 9 | 1001 | −p(n − 24) |
| 10 | 1010 | −p(n − 20) |
| 11 | 1011 | −p(n − 16) |
| 12 | 1100 | −p(n − 12) |
| 13 | 1101 | −p(n − 8) |
| 14 | 1110 | −p(n − 4) |
| 15 | 1111 | −p(n − 0) |

Another example of a suitable pulse position mapping is shown in Table 5. In this example, the modulator maps a 3-bit symbol for each modulation frame. Each symbol is represented in terms of the position k of the pulse shape p(n−k) and the sign of the pulse. In this example, $T_{MF}$ is 2 milliseconds resulting in a 16 possible positions for an 8 KHz sample rate. The pulses are separated by 4 time instances resulting in the assignment of 8 different pulse position and polarity combinations. In this example, the effective data rate is 3 bits per symbol in a 2 millisecond period or 1500 bits/second.

TABLE 5

| Symbol | | Pulse |
|---|---|---|
| decimal | binary | |
| 0 | 000 | p(n) |
| 1 | 001 | p(n − 4) |
| 2 | 010 | p(n − 8) |
| 3 | 011 | p(n − 12) |
| 4 | 100 | −p(n − 12) |
| 5 | 101 | −p(n − 8) |
| 6 | 110 | −p(n − 4) |
| 7 | 111 | −p(n) |

To increase robustness in poor channel conditions, the Modulator 235 may increase the duration of the modulation frame $T_{MF}$ while maintaining a constant number of time instances $t_0, t_1, \ldots, t_{m-1}$. This technique serves to place more temporal distance between the pulses resulting in a more reliable detection. An example of a suitable pulse position mapping includes a $T_{MF}$ of 4 milliseconds resulting in 32 possible positions for an 8 KHz sample rate. As in the previous example, if the pulses are separated by 4 time instances, the mapping results in the assignment of 16 different pulse position and polarity combinations. However, in this example, the separation between time instances is increased by a factor of 2 from the previous example, resulting in 8 different pulse position and polarity combinations. In a suitable example, the Modulator 235 may switch between different pulse position maps or modulation frame durations depending on a feedback signal indicating channel conditions or transmission success. For example, the Modulator 235 may start transmitting using $T_{MF}$ of 2 milliseconds then switch to $T_{MF}$ of 4 milliseconds if the channel conditions are determined to be poor.

To increase robustness with certain vocoders, the Modulator 235 may change the initial time offset in the pulse position map. An example of a suitable pulse position mapping is shown in Table 6. In this example, the modulator maps a 3-bit symbol per modulation frame. Each symbol is represented in terms of the position k of the pulse shape p(n−k) and the sign of the pulse. In this example, $T_{MF}$ is 2 milliseconds resulting in a 16 possible positions for an 8 KHz sample rate. The initial offset is set to 1 time instance and the pulses are separated by 4 time instances resulting in the assignment of 8 different pulse position and polarity combinations as shown in the table.

TABLE 6

| Symbol | | Pulse |
|---|---|---|
| decimal | binary | |
| 0 | 000 | p(n − 1) |
| 1 | 001 | p(n − 5) |
| 2 | 010 | p(n − 9) |
| 3 | 011 | p(n − 13) |
| 4 | 100 | −p(n − 13) |
| 5 | 101 | −p(n − 9) |
| 6 | 110 | −p(n − 5) |
| 7 | 111 | −p(n − 1) |

It should be recognized that reducing the number of separation time instances would result in an increased number of bits per symbol and thus higher data rates. For example, if $T_{MF}$ is 4 milliseconds the resulting number of possible positions for an 8 KHz sample rate is 32 with plus or minus polarity for each resulting in 64 different signals if no separation is included. For a 64 position map, the number of supported bits per symbol is 6 and the resulting effective data rate is 1500 bits per second. It should also be recognized that different combinations of $T_{MF}$ and sample rate may be used to achieve a desired effective bit rate.

An example of a suitable Pulse Shaper 239 is a root-raised cosine transform of the form:

$$r(t) = \begin{cases} 1 - \beta + \dfrac{4\beta}{\pi}, & t = 0 \\ \dfrac{\beta}{\sqrt{2}}\left[\left(1 + \dfrac{2}{\pi}\right)\sin\left(\dfrac{\pi}{4\beta}\right) + \left(1 - \dfrac{2}{\pi}\right)\cos\left(\dfrac{\pi}{4\beta}\right)\right], & t = \pm\dfrac{T_s}{4\beta} \\ \dfrac{\sin\left[\pi\dfrac{t}{T_s}(1-\beta)\right] + 4\beta\dfrac{t}{T_s}\cos\left[\pi\dfrac{t}{T_s}(1+\beta)\right]}{\pi\dfrac{t}{T_s}\left[1 - \left(4\beta\dfrac{t}{T_s}\right)^2\right]}, & \text{otherwise} \end{cases}$$

where β is the roll-off factor, $1/T_s$ is the maximum symbol rate, and t is the sampling time instance.

For the previous example with 32 possible pulse positions (time instances), the following transform generates the root raised cosine pulse shape where the number of zeros prior to the first nonzero element of the pulse determines the exact position of the pulse within the frame.

$$r(n) = \begin{bmatrix} 0 & 0 & 0 & 40 \\ -200 & 560 & -991 & -1400 \\ 7636 & 15000 & 7636 & -1400 \\ -991 & 560 & -200 & 40 \\ 0 & 0 & 0 & 0 \\ 0 & 0 & 0 & 0 \\ 0 & 0 & 0 & 0 \\ 0 & 0 & 0 & 0 \end{bmatrix}$$

It should be recognized that the transform may be shortened or lengthened for different variants of modulation fame sizes.

Figure 14A:
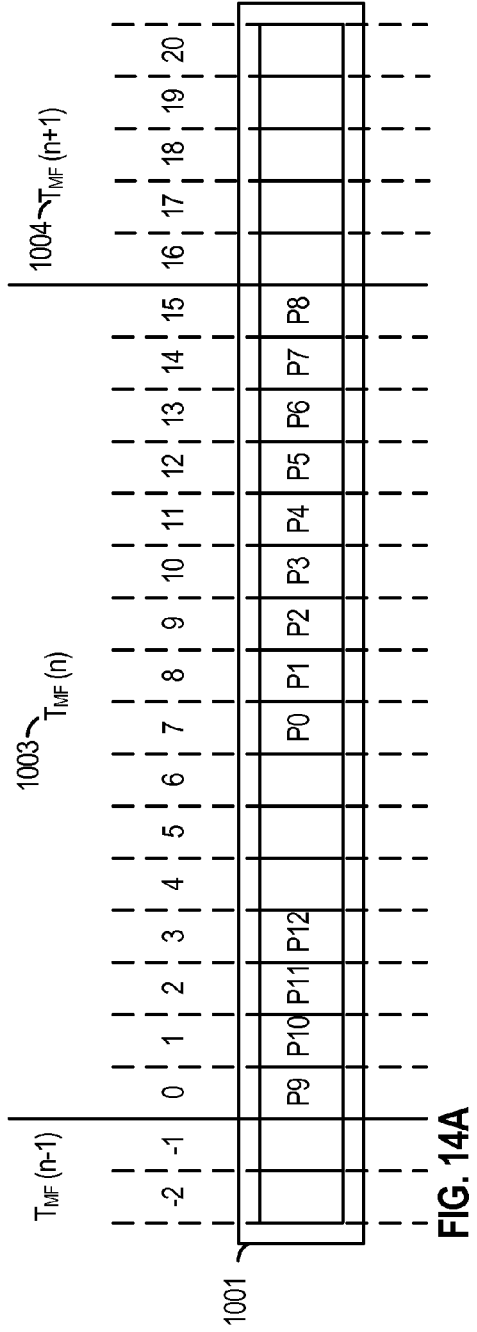
FIG. 14A is a diagram of an embodiment of a shaped pulse placement within a modulation frame using a wraparound technique.
Figure 14B:
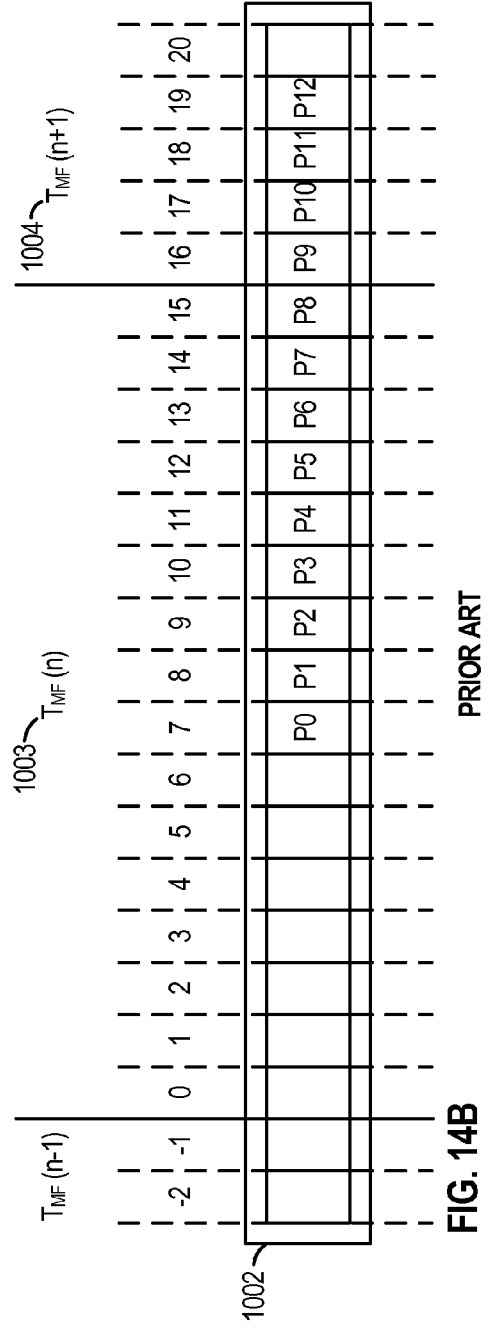
FIG. 14B is a diagram of an embodiment of a shaped pulse placement within a modulation frame for a typical example in the art.

FIG. 14A is an example of the placement of a pulse within a modulation frame to generate a particular entry in the modulation alphabet. In FIG. 14A, a pulse is represented by 13 samples shown as P0-P12 where each sample represents the nonzero elements of r(n) shown in the previous example. FIG. 14B is an example of the typical implementation in the art. In FIG. 14B, a pulse is positioned at offset 7 within modulation frame $T_{MF}$(n) 1003, and the "tail" portion of the pulse extends into the next modulation frame $T_{MF}$(n+1) 1004 by 4 samples (P9-P12). Samples from modulation frame $T_{MF}$(n) 1003 extending into the next modulation frame $T_{MF}$(n+1) 1004 as shown in FIG. 14B would result in intersymbol interference if the pulse samples for frame $T_{MF}$(n+1) are positioned in any of the first 4 samples of frame $T_{MF}$(n+1), since an overlap of samples would occur. Alternatively, in the "wraparound" technique shown in FIG. 14A, the tail samples which would have extended into the next modulation frame, $T_{MF}$(n+1) 1004, are placed at the beginning of the current modulation frame, $T_{MF}$(n) 1003. The samples (P9-P12) are wrapped around to the beginning of $T_{MF}$(n) at samples 0-3. Using a wraparound technique for the generation of a modulation alphabet eliminates the cases where the shaped pulse samples extend into the next modulation frame. The wraparound technique is advantageous since it results in reduced intersymbol interference that would occur if the shaped pulse samples in the present frame extend into the next frame and overlap with the shaped pulse samples in the next frame. One skilled in the art would recognize that the wraparound technique could be used for any pulse position in the modulation frame which would result in samples extending in the next modulation frame. For example, a pulse positioned at offset 8 within modulation frame $T_{MF}$(n) 1003 would wraparound samples (P8-P12).

Another example of a suitable Pulse Shaper 239 is an amplitude transform signal of the form:

$$r(n) \cdot p(n-t)$$

An example of a 32 sample amplitude transform signal is of the form:

$$r(n) = \begin{bmatrix} -2000 & 0 & 6000 & -2000 \\ 0 & 0 & 0 & 0 \\ 0 & 0 & 0 & 0 \\ 0 & 0 & 0 & 0 \\ 0 & 0 & 0 & 0 \\ 0 & 0 & 0 & 0 \\ 0 & 0 & 0 & 0 \\ 0 & 0 & 0 & 0 \end{bmatrix}$$

Another example of a suitable Pulse Shaper 239 is a linear prediction synthesis filter. The response of an example recursive LPC synthesis filter is defined by its impulse response $$h(n) = \delta(n) + \sum_{i=1}^{10} a_i h(n-i)$$

and coefficients: a(i)={−6312, 5677, −2377, 1234, −2418, 3519, −2839, 1927, −629, 96}/4096, i=1, . . . , 10. Linear prediction filters are well known in the art. The residual signal r(n) is first created by the input symbols according to the pulse mapping tables above. The actual modulation pulse shape then results from filtering the modulated signal r(n) with h(n).

One skilled in the art will recognize that the techniques described herein may be equally applied to different pulse shapes and transforms. The length of the waveforms and the modulation schemes applied to these waveforms may also vary. Moreover, the pulse shapes may use completely uncorrelated (or orthogonal) waveforms to represent different symbols. In addition to polarity of the shaped pulse, amplitude of the shaped pulse may also be used to carry information.

Referring again to FIG. 2, Mute Out S240 is a signal used to separate the Tx message transmissions and is generated by the Muting Generator 255. An example of a suitable composite Tx Data S230 signal comprised of a multiplexed Tx Mod Out S235 and Mute Out S240 is shown in FIG. 9. Tmu1 731, Td1 732, Tmu2 733, Td2 734, Tmu3 735, Td3 736, and Tmu4 737 represent the durations in time each signal is transmitted. An example of a suitable range for Tmu1, Tmu2, Tmu3, and Tmu4 is 10-60 milliseconds and Td1, Td2, and Td3 is 300-320 milliseconds for normal operation and 600-640 milliseconds for robust operation. Examples of a suitable muting generator sequence may be an all-zero sequence signal or a sinusoidal frequency signal. Another suitable example of a signal used to separate the Tx message transmissions is shown in FIG. 10. In this example, the Wakeup Out S236 signal and Sync Preamble Out S242 precede each transmission of Tx Mod Out S235. One skilled in the art will recognize that different combinations of the Sync Preamble Out S242, Mute Out S240, and Tx Mod Out S235 may be equally applied. For example Tx Mod Out S235 in FIG. 10 may be preceded and followed by Mute Out S240.

Receiver

Referring to FIG. 1, the receive baseband 400 normally routes decoded voice packets from the vocoder to an audio processor, but is also capable of routing the decoded packets through a data demodulator. Because the non-speech data was converted to a noise-like signal and encoded by the vocoder at the transmitter, the receiver's vocoder is able to effectively decode the data with minimal distortion. The decoded packets are continually monitored for an in-band synchronization signal. If a synchronization signal is found, the frame timing is recovered and the decoded packet data is routed to a data demodulator. The decoded packet data is demodulated into messages. The messages are deformatted and output. A protocol sequence comprising synchronization, control, and messages ensures reliable detection and demodulation of the non-speech data.

Voice packets are received over the communication channel 502 in the receiver 495 and input to the vocoder decoder 390 where decoded voice is generated then routed through the de-mux 320 to the audio out processor and speaker 315 generating output audio S310.

Once a synchronization signal is detected in Vocoder Decoder Output S370 by the Sync Detector 350, the Rx De-Mux Control S360 signal switches to the Rx data path in the Rx De-Mux 320. The vocoder packets are decoded by the vocoder decoder 390 and routed by the Rx De-Mux 320 to the Rx Timing 380 then the Rx data modem 330. The Rx data is demodulated by the Rx data modem 330 and forwarded to the data message deformatter 301 where output data S300 is made available to the user or interfaced equipment.

An example of a suitable data message deformatter 301 includes circuitry to deinterleave the Rx Message S320 data, implement error control decoding such as hybrid automatic repeat-request (HARQ), and calculate and check the cyclic redundancy check (CRC) bits. Suitable output data S300 may include user interface (UI) information, user position/location information, time stamps, equipment sensor information, or other suitable data.

Figure 15A:
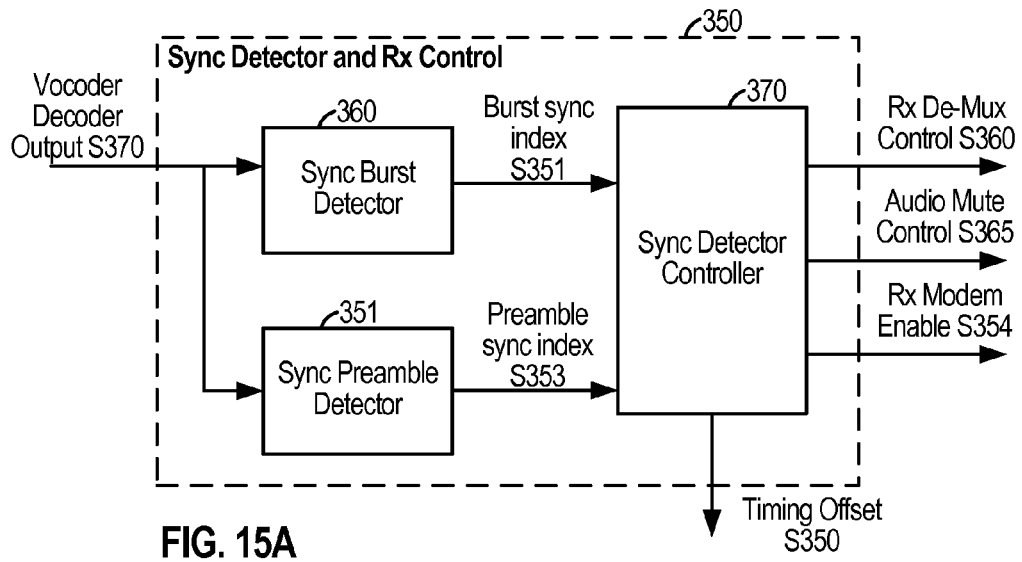
FIG. 15A is a diagram of an embodiment of a synchronization signal detector and receiver controller.

FIG. 15A is a suitable example block diagram of the Sync Detector and Receiver Controller 350 shown in FIG. 1. Signal Vocoder Decoder Output S370 is input to the Sync Burst Detector 360 and the Sync Preamble Detector 351. The Sync Burst Detector 360 detects the transmitted Sync Burst signal in the Vocoder Decoder Output S370 and generates the Burst sync index S351. The Sync Preamble Detector 351 detects the transmitted Sync Preamble Out signal in the Vocoder Decoder Output S370 and generates Preamble sync index S353. Signals Burst sync index S351 and Preamble sync index S353 are input to the Sync Detector Controller 370. The Sync Detector Controller 370 generates output signals Rx De-Mux Control S360 which routes the Vocoder Decoder Output S370 to the data path S326 or the audio path S325, Audio Mute Control S365 which enables or disables the output audio signal S310, and Timing Offset S350 which provides bit timing information to the Rx Timing 380 to align the Rx Data S326 for demodulation.

Figure 15B:
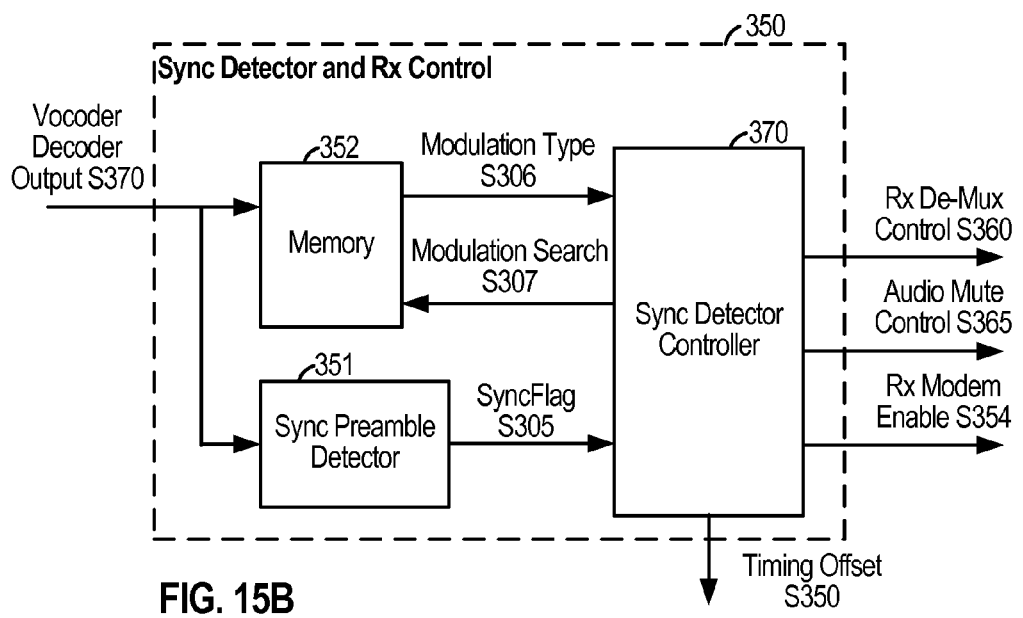
FIG. 15B is a diagram of another embodiment of a synchronization signal detector and receiver controller.

Another example of a suitable Sync Detector 350 is shown in FIG. 15B. Signal Vocoder Decoder Output S370 is input to the Memory 352 and the Sync Preamble Detector 351. The Memory 352 is used to store the latest Vocoder Decoder Output S370 samples which includes the received Wakeup Out signal. A suitable example of the Memory 352 is a First-In-First-Out (FIFO) or Random Access Memory (RAM). The Sync Preamble Detector 351 detects the transmitted Sync Preamble Out signal in the Vocoder Decoder Output S370 and outputs the SyncFlag S305 signal. Signals Modulation Type S306 and SyncFlag S305 are input to the Sync Detector Controller 370. The Sync Detector Controller 370 generates the Modulation Search S307 signal which is used to access the Memory 352, find the received Wakeup Out signal based on the Timing Offset S350, and evaluate the Wakeup Out Signal to determine the type of modulation used in the transmission. The resulting detected modulation type is output from the Memory 352 as Modulation Type S306. The Sync Detector Controller 370 also generates output signals Rx De-Mux Control S360 which routes the Vocoder Decoder Output S370 to the data path or the audio path, Audio Mute Control S365 which enables or disables the output audio signal S310, and Timing Offset S350 which provides bit timing information to Rx Timing 380 to align the Rx Data S326 for demodulation.

Figure 16:
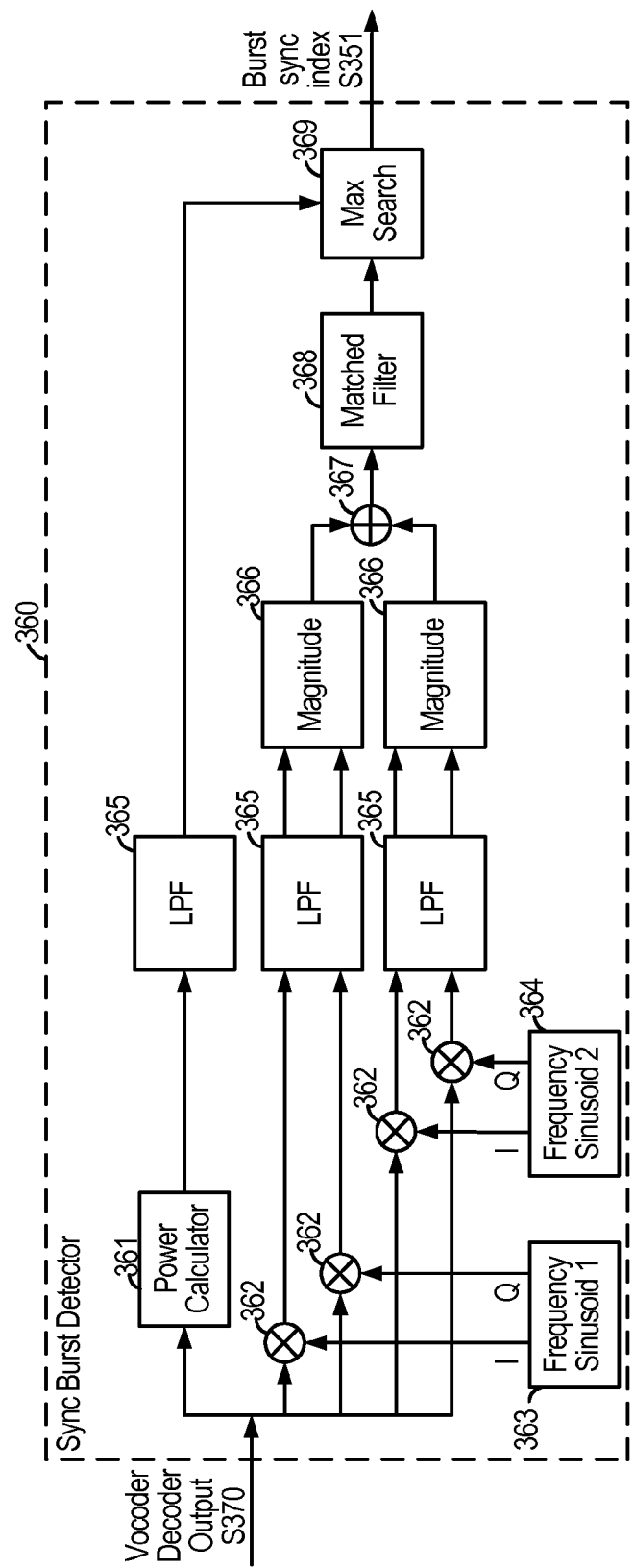
FIG. 16 is a diagram of an embodiment of a synchronization burst detector.

An example of a suitable Sync Burst Detector 360 is shown in FIG. 16. Signal Vocoder Decoder Output S370 is input to the Power calculator 361. Examples of a suitable Power calculator 361 include an input squaring function or absolute value function calculated on the input signal. The Vocoder Decoder Output S370 signal is also input to mixer functions 362 where it is multiplied by the in-phase and quadrature components of reference Frequency Sinusoid 1 363 and Frequency Sinusoid 2 364 to generate downconverted signal components at frequency 0 Hz. The mixer 362 outputs are low pass filtered by the LPF 365 to eliminate the high frequency multiplier products in the mixed output. An example transfer function of a suitable LPF 365 is of the form:

$$H_{IIR}(z) = c \cdot \frac{1 + a_1 z^{-1} + a_2 z^{-2}}{1 + b_1 z^{-1} + b_2 z^{-2}}$$

where $c=0.0554$, $a_1=2$, $a_2=1$, $b_1=-1.9742$, $b_2=0.9744$. The magnitude of in-phase and quadrature outputs of the LPF 365 are calculated by the Magnitude 366 and summed in the Adder 367. The output of the Adder 367 is input to the Matched Filter 368 which is a matched to the transmitted Sync Burst Sequence. Matched filters are well known in the art. The output of the Matched Filter 368 is searched for the maximum peak in the Max Search 369. Once the maximum is found in the Max Search 369, the index corresponding to the time offset of the maximum is output in signal Burst sync index S351.

Figure 17A:
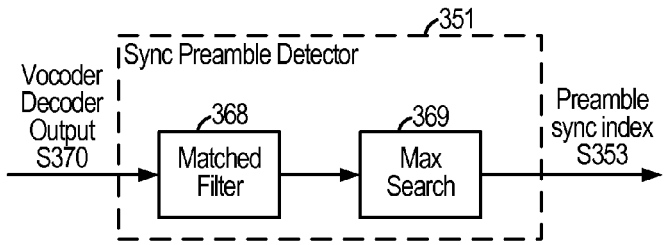
FIG. 17A is a diagram of an embodiment of a synchronization preamble detector.

An example of a suitable Sync Preamble Detector 351 is shown in FIG. 17A. Signal Vocoder Decoder Output S370 is processed by the Matched Filter 368 which is matched to the Sync Preamble Sequence. The Matched Filter 368 output is then input to the Max Search 369 which searches for the maximum peak. Once the maximum is found in the Max Search 369, the index corresponding to the time offset of the maximum is output in Preamble sync index S353.

Figure 17B:
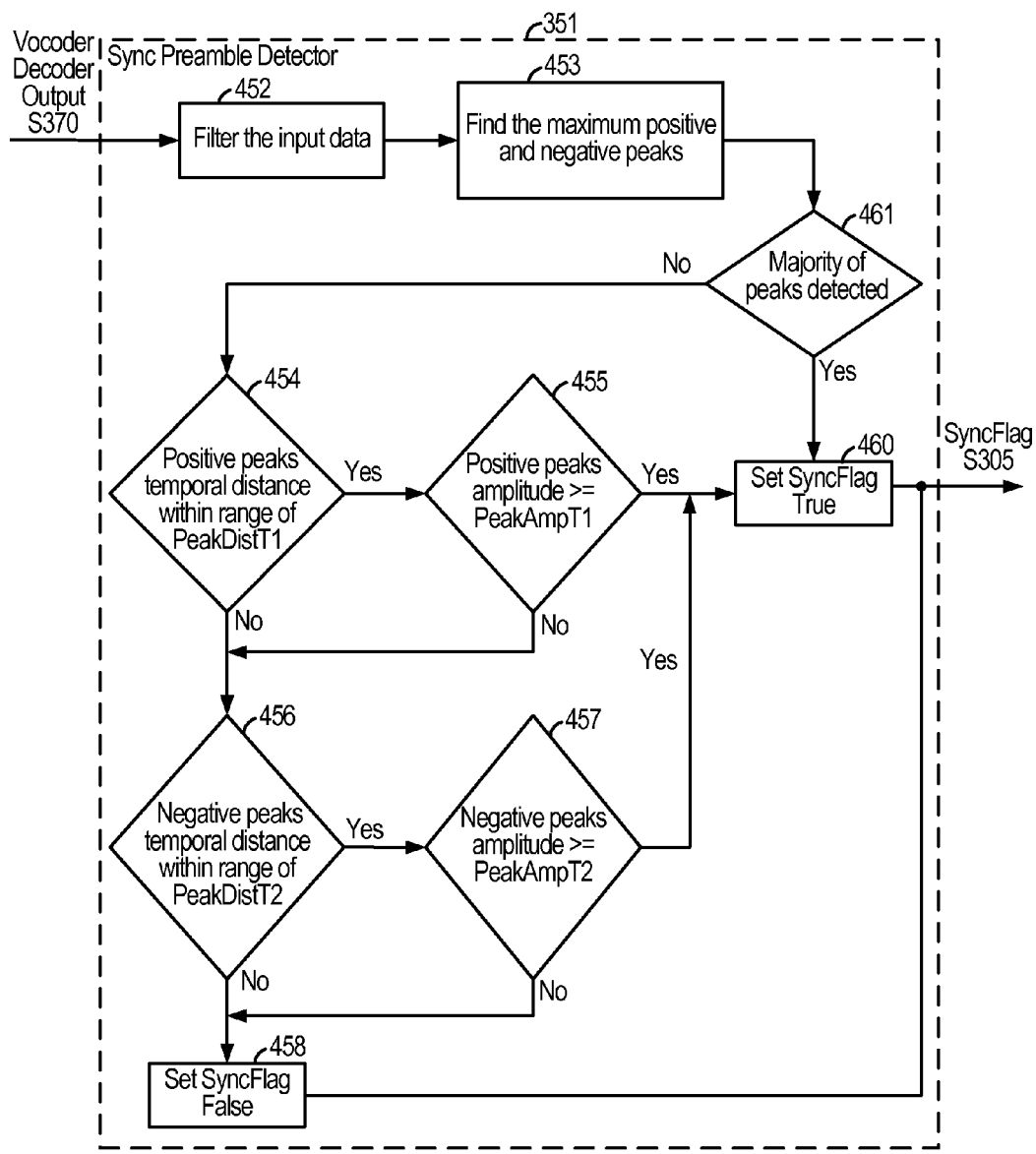
FIG. 17B is a diagram of another embodiment of a synchronization preamble detector.

Another example of a suitable Sync Preamble Detector 351 is shown in FIG. 17B. Signal Vocoder Decoder Output S370 is processed by the filter in step 452. A suitable example of the filter in step 452 is a sparse filter with coefficients based on the band-pass filtered impulse response of the Sync Preamble Sequence. A sparse filter has a finite-impulse-response structure with some of the coefficients set to zero and results in a reduction in the computational complexity based on fewer required multipliers due to the zero coefficients. Sparse filters are well known in the art. In step 453 the filter output is searched for the maximum positive and negative correlation peaks which match an expected pattern based on the negative and positive correlation peak distance. For example, 5 peaks should be found in step 453 based on Sync Preamble Sequence 245, 3 positive peaks corresponding to correlation with the pseudorandom noise (PN) sequence 243 and 2 negative peaks corresponding to correlation with the inverted version of the PN sequence 244. In a suitable example, the sync detector should find at least 2 peaks in order to declare that the sync preamble is detected. In step 461, the number of peaks detected is counted and if a majority of peaks is detected, then a sync indicator flag is set True in step 460, indicating the preamble sync has been detected. A suitable example of a majority of peaks detected is 4 out of 5 peaks which match the expected pattern. If a majority of peaks is not detected then control passes to step 454, where the temporal distance between the positive peaks found in step 453 is compared against the expected distance, PeakDistT1. The PeakDistT1 is set to be a function of the period of the PN sequence 242 since filtering the received preamble against PN sequence 242 should yield a temporal distance between the correlation peaks which is equal to some multiple of the period. If the temporal distance between the positive peaks is found to be within a range of PeakDistT1, the positive peaks amplitudes are then checked against a threshold PeakAmpT1 in step 455. A suitable range for PeakDistT1 is plus or minus 2 samples. The PeakAmpT1 is a function of the amplitudes of the previous peaks found. In a suitable example, the PeakAmpT1 is set such that the peaks found in step 453 do not differ in amplitude by more than a factor of 3 and the average peak amplitude does not exceed half the maximum peak amplitude observed up to that point. If either the positive peak temporal distance check in step 454 or the amplitude check in step 455 fails then the negative peak temporal distance is checked in step 456. If the negative peak temporal distance is within a range of PeakDistT2 then the negative peak amplitudes are checked against a threshold PeakAmpT2 in step 457. A suitable range for PeakDistT2 is plus or minus 2 samples. PeakDistT2 is set to be a function of the period of the PN sequence 242 and the PeakAmpT2 is set to be a function of the amplitudes of the previous peaks found. If either the positive peak temporal distance check in step 454 and the positive peak amplitude check in step 455 or the negative peak temporal distance check in step 456 and the negative peak amplitude check in step 457 pass then a sync indicator flag is set True in step 460, indicating the preamble sync has been detected. If either the negative peak temporal distance check in step 456 or negative peak amplitude check in step 457 fails then the sync indicator flag is set False in step 458, indicating the preamble sync has not been detected. It should be recognized that different orders and combinations of the steps will achieve the same result. For example, detecting the majority peaks in step 461 of may be done after the positive peak check of steps 454 and 455.

Figure 18A:
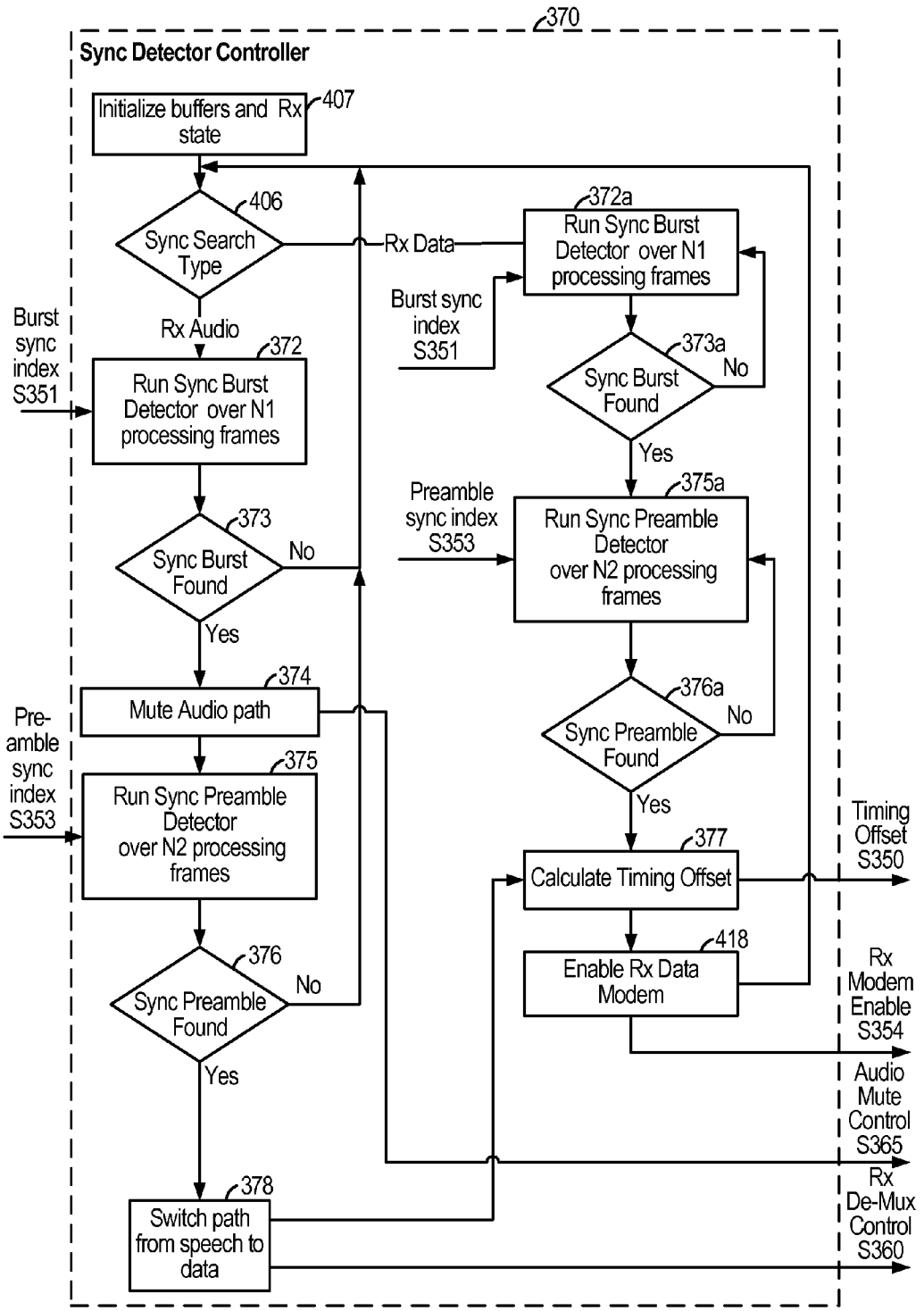
FIG. 18a is a diagram of an embodiment of a synchronization detector controller.

An example of a suitable Sync Detector Controller 370 is shown in FIG. 18a. Step 407 is the entry point in the controller which initializes the memory buffers and configures the initial state of the receiver. In step 406, the sync search type is checked indicating whether the sync signal is being searched in the Rx data or Rx audio path. Step 372 is entered if the Rx audio path is being searched for sync. Using Burst sync index S351, the maximum sync burst and index are searched over a number of processing frames, N1 in step 372. Step 373 determines if the maximum sync burst and index searched in step 372 passes a successful search criterion. An example of a suitable search decision criterion in step 373 is of the form:

$$(s_{max\ max} \geq Th_{SB}) \text{ and } (i_{smax} \leq N_{sync} - N_{guard})$$

where $s_{max\ max}$ is the maximum of the sync bursts found over the N1 processing frames, $Th_{SB}$ is the sync burst detection threshold, $i_{smax}$ is the maximum sync burst index, $N_{sync}$ is the number of processing frames searched and $N_{guard}$ is a latency period in processing frames. If a sync burst is not found, control is passed back to step 406 and the search is restarted. If a sync burst is found, control passes to step 374 where signal Audio Mute Control S365 is generated to prevent the audio path from being output on the speaker. In step 375 using Preamble sync index S353, the maximum sync preamble and index are searched over a number of processing frames, N2. Step 376 determines if the maximum sync preamble and index searched in step 375 passes a successful search criterion. An example of a suitable search decision criterion in step 376 is of the form:

$$(c_1 \cdot (s_{max\ max}/P(i_{s\ max}))^2 + c_2 \cdot z_{max\ max}^2) \geq Th_{PD}$$

where $s_{max\ max}$ is the maximum of the sync bursts found over the N1 processing frames, $c_1$ and $c_2$ are scaling factors, $z_{max\ max}$ is the maximum of the outputs of the matched filter 368 in Sync the Preamble Detector 351, $P(i_{s\ max})$ is the maximum power input to the Max Search 369 in the Sync Burst Detector 360 at the maximum sync burst index, $i_{smax}$. If a sync preamble is not found in step 376, control is passed back to step 406 and the search is restarted. If a sync preamble is found, signal Rx De-Mux Control S360 is generated in step 378 to switch to the Rx data path in De-Mux 320. Control is then passed to step 377 where signal Timing Offset S350 is calculated. An example of a suitable Timing Offset calculation is of the form:

$$\text{Timing Offset} = ((i_{zmax} - N_{sync} - 1) \cdot N_{samp}) + (k_{max} \cdot i_{zmax})$$

where $i_{zmax}$ is the index at the maximum of the output of the matched filter 368 in the Sync Preamble Detector 351 over one frame, $N_{sync}$ is the number of processing frames searched, $N_{samp}$ is the number of samples in one frame, and $k_{max}$ is the phase of the maximum of the output of the matched filter 368 in the Sync Preamble Detector 351 over one frame. Control is then passed to step 418 where the Rx Modem 330 is enabled via signal Rx Modem Enable S354, then finally passed back to step 406 and the search is restarted. Step 372a is entered if the Rx data path is being searched for sync. Steps 372a, 373a, 375a, and 376a function the same as steps 372, 373, 375, and 376 respectively; the main difference being that the audio path is not muted and the De-Mux is not switch from Rx Audio to Rx data when the Sync Search Type checked in step 406 is Rx Data.

Figure 18B:
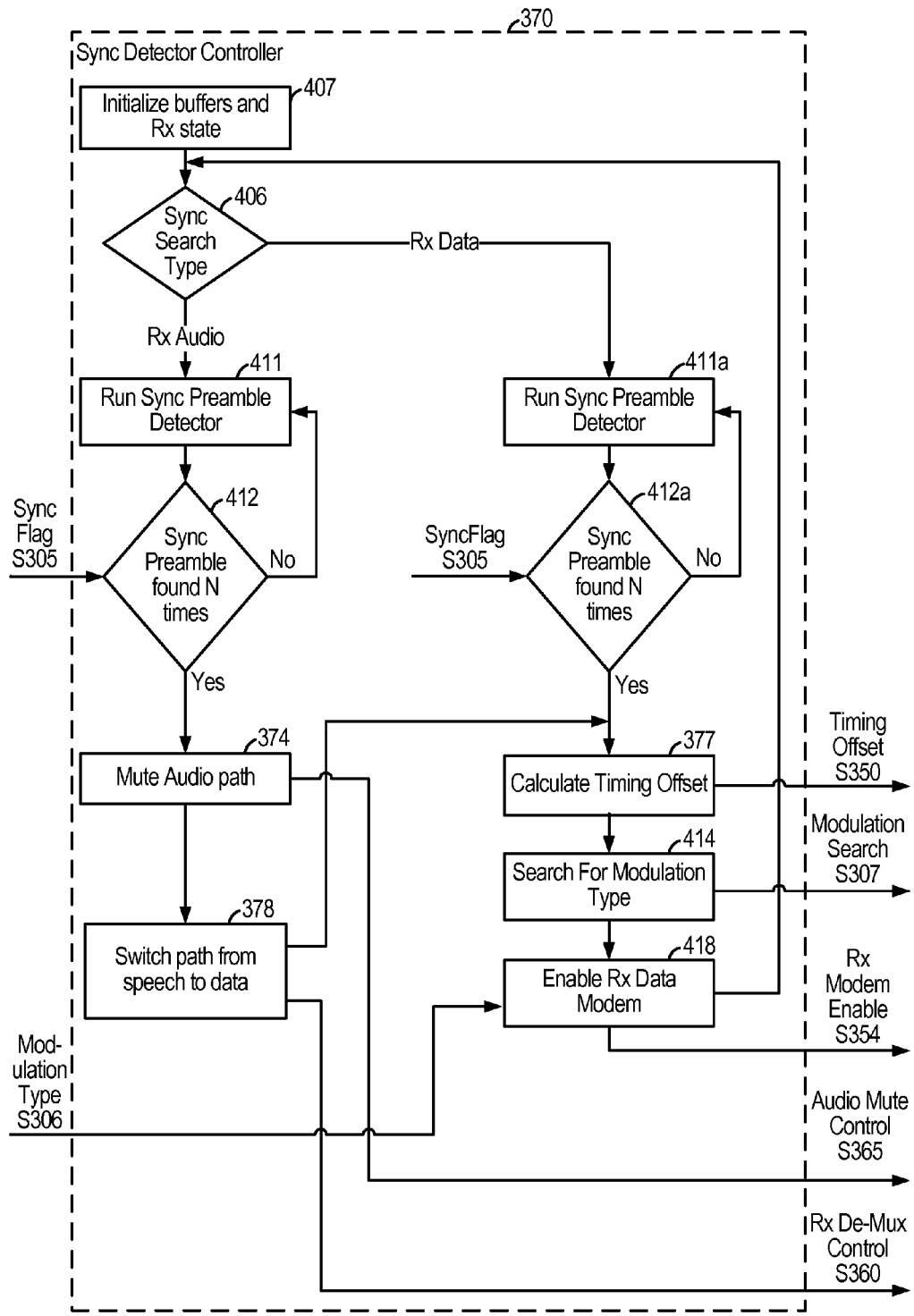
FIG. 18b is a diagram of another embodiment of a synchronization detector controller.

Another example of a suitable Sync Detector Controller 370 is shown in FIG. 18b. Step 407 is the entry point in the controller which initializes the memory buffers and configures the initial state of the receiver. In step 406, the sync search type is checked indicating whether the sync signal is being searched in the Rx data or Rx audio path. Control then passes to step 411 where the Preamble Detector 351 is enabled. Step 412 checks the signal SyncFlag S305, indicating a Sync Preamble has been found, then confirms it by repeatedly checking for a SyncFlag S305 a total of N times. A suitable value for N is 1 (that is; only 1 preamble detected without confirmation) for the Destination Terminal 600 and 3 for the Source Terminal 100. If a sync preamble is found, signal Audio Mute Control S365 is generated to prevent the audio path from being output to the speaker. Signal Rx De-Mux Control S360 is then generated in step 378 to switch from the Rx audio path to the Rx data path in De-Mux 320. Control is then passed to step 377 where signal Timing Offset S350 is calculated. An example of a suitable Timing Offset calculation is of the form:

$$\text{Timing Offset} = \text{PulsePosition} + \text{PeakDistance}$$

PulsePosition is a time distance from the positive correlation peak to a first reference time instance, and may be a positive or negative value. PeakDistance is a time distance between the positive correlation peak and negative correlation peak. An example of a suitable first reference time instance may be a certain sample position relative to the current received speech frame. Another example of a suitable Timing Offset calculation is of the form:

$$\text{Timing Offset} = \text{PulsePosition}$$

PulsePosition is a time distance from the negative correlation peak to a second reference time instance, and may be a positive or negative value. An example of a suitable second reference time instance may be a certain sample position relative to the current received speech frame. Control is then passed to step 414 where the Modulation Type is determined via signal Modulation Search S307 by searching in the Memory 352 at a predetermined position where the received Wakeup Out signal should be stored. Control is then passed to step 418 where the Rx Modem 330 is enabled via the signal Rx Modem Enable S354. The demodulation scheme used in Rx Modem Enable S354 is determined in step 418 by the Modulation Type S306 input signal. Control is finally passed back to step 406 and the search is restarted. Step 411a is entered if the Rx data path is being searched for sync. Steps 411a, and 412a function the same as steps 411, and 412 respectively; the main difference being that the audio path is not muted and the De-Mux is not switch from Rx Audio to Rx data when the Sync Search Type checked in step 406 is Rx Data. It should be recognized that different orders and combinations of the steps will achieve the same result. For example, steps Mute Audio Path 374 and the path switch step 378 may be swapped with no effect on the overall sync detection.

FIG. 19 is a suitable example block diagram of Rx Timing 380 shown in FIG. 1. The Rx Timing 380 is used to align the modulation frame boundary in the data output from the vocoder decoder 390 so that demodulation in the Rx data modem 330 can occur. Signal Rx Data S326 is input to Buffer 381 where several samples are stored. Suitable examples of Buffer 381 include first-in-first-out (FIFO) memory or random access memory (RAM). The samples from the Buffer 381 are input to the Variable Delay 382 where a time delay is applied to align the modulation frame boundary corresponding to the Timing offset S350 control signal. A suitable delay applied in Variable Delay 382 may be any number of samples from zero to the frame size−1. The delayed signal is output as Adjusted Rx Data S330.

FIG. 20 is a suitable example block diagram of the Rx data modem 330 shown in FIG. 1. Two signals are de-multiplexed in time from the Adjusted Rx Data S330 input signal through Rx Data Modem De-mux 331; De-Mux Mute S332, and De-Mux Rx Data S333. De-Mux mute S332 is a separation or muting period which may exist between successive received messages and is stripped from the Adjusted Rx Data S330 signal if the separation or muting signal has been applied at the transmitter. De-Mux Rx Data S333 is the received modulated message signal input to the Demodulator 335. The Demodulator 335 demodulates the received message information bits from the adjusted Rx Data S330. The Rx data modem 330 uses the demodulation frame boundary determined by the Rx Timing 380 and the demodulation type indicator determined by the Sync Detector Controller 370 to determine a data signal pulse position and calculate an output data symbol based on the data signal pulse position. An example of a suitable demodulator is a matched filter correlator matched to all allowed cyclic shifts of the modulation pulse shape applied by the transmit data modulator. Another example of a suitable demodulator is a matched filter correlator matched to a bandpass filtered version of the pulse applied by the transmit data modulator where the bandpass filter represents the transmission characteristics of the channel.

System

Figure 21:
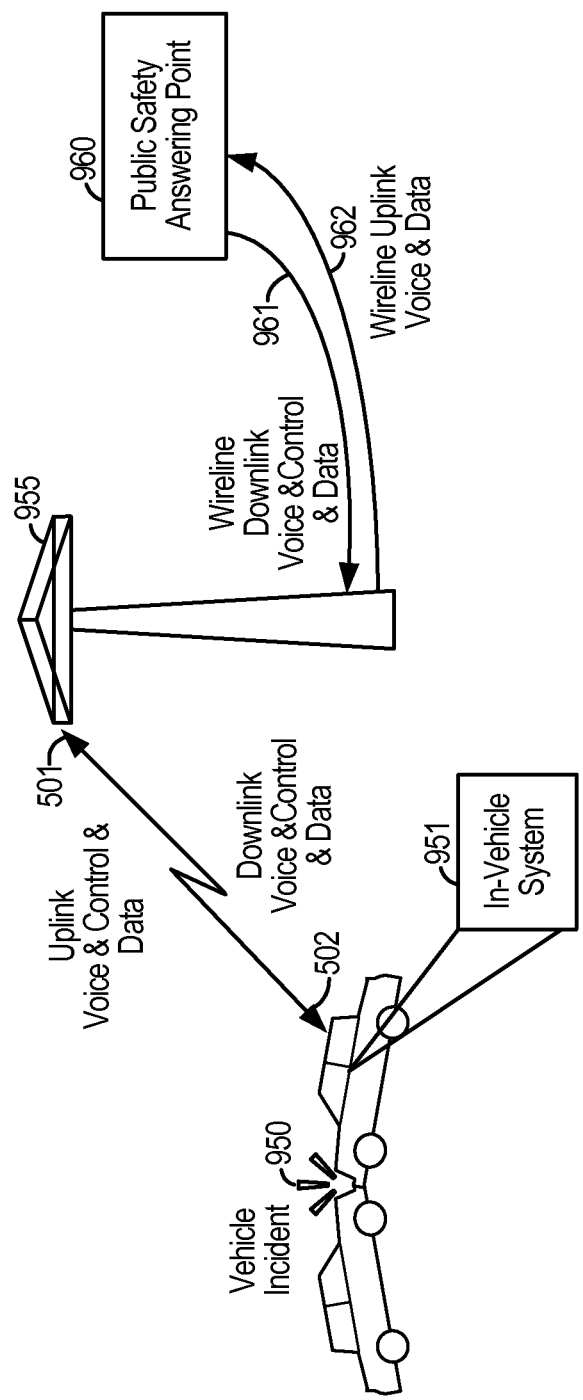
FIG. 21 is a diagram of an embodiment of an in-vehicle emergency call system.

FIG. 21 is an example use case of the system and methods disclosed herein. The diagram represents a typical example of the in-vehicle emergency call (eCall) system. A vehicle incident 950 is shown as an accident between two vehicles. Other suitable examples for vehicle incident 950 include multiple vehicle accident, single vehicle accident, single vehicle flat tire, single vehicle engine malfunction or other situations where the vehicle malfunctions or the user is in need of assistance. The In-Vehicle System (IVS) 951 is located in one or more of the vehicles involved in the vehicle incident 950 or may be located on the user himself. The In-Vehicle System 951 may be comprised of the source terminal 100 described herein. The In-Vehicle System 951 communicates over a wireless channel which may be comprised of an uplink communications channel 501 and downlink communications channel 502. A request for data transmission may be received by the In-Vehicle System through the communications channel or may be automatic or manually generated at the In-Vehicle System. A wireless tower 955 receives the transmission from the In-Vehicle System 951 and interfaces to a wireline network comprised of a wireline uplink 962 and wireline downlink 961. A suitable example of a wireless tower 955 is a cellular telephone communications tower comprised of antennas, transceivers, and backhaul equipment, all well-known in the art, for interfacing to the wireless uplink 501 and downlink 502. The wireline network interfaces to a Public Safety Answering Point (PSAP) 960, where emergency information transmitted by the In-Vehicle System 951 may be received and control and data transmitted. The Public Safety Answering Point 960 may be comprised of the destination terminal 600 described herein. The communication between the In-Vehicle System 951 and the Public Safety Answering Point 960 is accomplished using the interaction diagrams described in the following sections.

Figure 22:
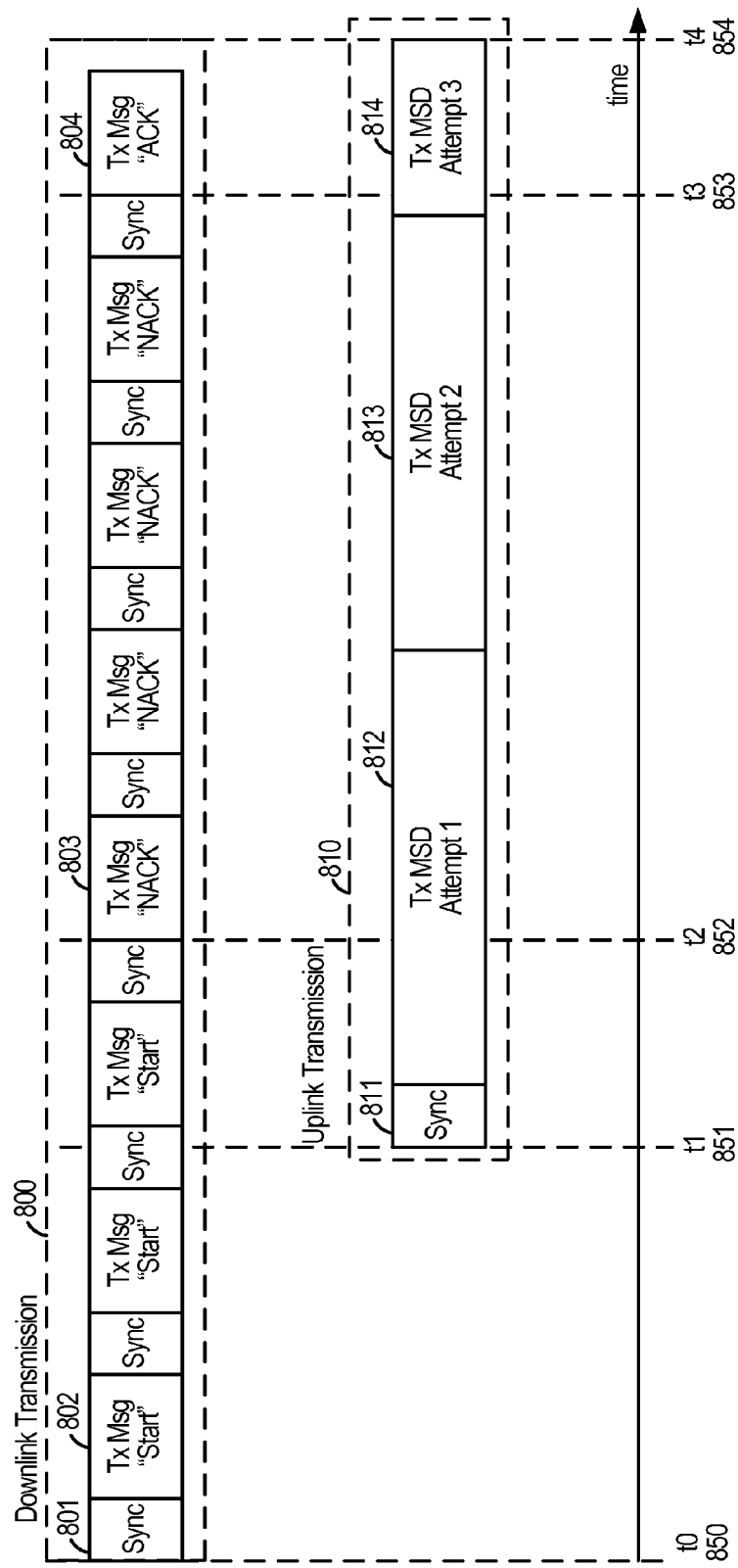
FIG. 22 is a diagram of an embodiment of an interaction of the data request sequence transmitted on a downlink in a destination communication terminal and the data response sequence transmitted on an uplink in a source communication terminal, with the interaction initiated by the destination terminal.

FIG. 22 is an example interaction diagram of the synchronization and data transmission sequences between the Source Terminal 100 and the Destination Terminal 600. In this example, the Uplink Transmission sequence 810 is initiated by the Destination Terminal 600. The Downlink Transmission sequence 800 is the transmission of sync and data messages from the Destination Terminal 600 to the Source Terminal 100 and the Uplink Transmission sequence 810 is the transmission of sync and data messages from the Source Terminal 100 to the Destination Terminal 600. The Downlink Transmission sequence 800 is initiated at time t0 850 by the Destination Terminal 600 with a sync sequence 801. Suitable examples of the sync sequence 801 are those described in FIG. 8A, FIG. 8B, and FIG. 8C. Following the sync sequence 801, the Destination Terminal 600 transmits a "Start" message 802 to command the Source Terminal 100 to begin transmitting its Uplink Transmission 810 sequence. The Destination Terminal 600 continues to transmit an alternating sync 801 and "Start" message 802 and waits for a response from the Source Terminal 100. At time t1 851 the Source Terminal 100, having received the "Start" message 802 from the Destination Terminal 600, begins transmitting its own sync sequence 811. Suitable examples of the sync sequence 811 are those described in FIG. 8A, FIG. 8B, and FIG. 8C. Following the sync sequence 811, the Source Terminal 100 transmits a minimum set of data or "MSD" message 812 to the Destination Terminal 600. A suitable example of data comprising the MSD message 812 includes sensor or user data formatted by a data message formatter 210. At time t2 852 the Destination Terminal 600, having received the sync message 811 from the Source Terminal 100, begins transmitting a negative acknowledgement or "NACK" message 803 to the Source Terminal 100. The Destination Terminal 600 continues to transmit an alternating sync 801 and "NACK" message 803 until it successfully receives the MSD message 812 from the Source Terminal 100. A suitable example of successfully receiving the MSD message 812 includes verifying a cyclic redundancy check performed on the MSD message 812. At time t3 853, the Destination Terminal 600, having successfully received the MSD message, begins transmitting an alternating sync 801 and acknowledge or "ACK" message 804. The Source Terminal 100 may attempt to send the MSD message 812 multiple times (813, 814) until it receives the "ACK" message 804. In a suitable example, if the Source Terminal 100 attempts to send the MSD message more than 8 times wherein each attempt is a different redundancy version, it switches to a more robust modulation scheme identified by the Wakeup signal S236. A suitable example of a more robust modulation scheme includes increasing the duration of the modulation frame $T_{MF}$ while maintaining a constant number of time instances as described previously. At time t4 854 the Source Terminal 100, having received the "ACK" message 804 from the Destination Terminal 600 discontinues transmission of the MSD message 814. In a suitable example, a retransmission is requested by the Destination Terminal 600 via transmitting the start messages 802 again after a predetermined number of "ACK" messages 804 have been sent by the Destination Terminal 600.

Figure 23A:
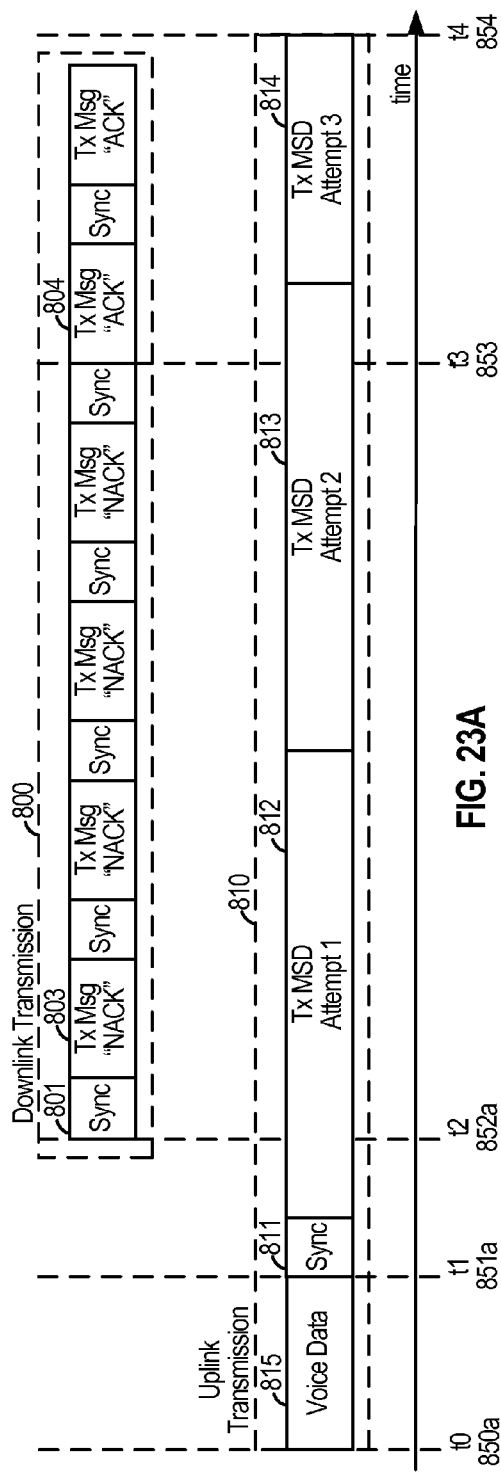
FIG. 23A is a diagram of an embodiment of an interaction of the data request sequence transmitted on a downlink in a destination communication terminal and the data response sequence transmitted on an uplink in a source communication terminal, with the interaction initiated by the source terminal.

FIG. 23A is another example interaction diagram of the synchronization and data transmission sequences between the Source Terminal 100 and the Destination Terminal 600. In this case, the Uplink Transmission sequence 810 is initiated by the Source Terminal 100. The Uplink Transmission sequence 810 is initiated at time t0 850a by the Source Terminal 100 with Voice data 815 by configuring the Source Terminal 100 Transmit baseband 200 to the Tx audio path S225. At time t1 851a, the Source Terminal 100 configures Transmit baseband 200 to the Tx data path S230 and begins transmitting its sync sequence 811 followed by the MSD message 812. At time t2 852a the Destination Terminal 600, having received the sync message 811 from the Source Terminal 100, begins transmitting an alternating sync 801 and "NACK" message 803 to the Source Terminal 100. The Destination Terminal 600 continues to transmit an alternating sync 801 and "NACK" message 803 until it successfully receives the MSD message from the Source Terminal 100. At time t3 853, the Destination Terminal 600, having successfully received the MSD message 813, begins transmitting an alternating sync 801 and acknowledge or "ACK" message 804. The Source Terminal 100 may attempt to send the MSD message 812 multiple times until it receives the "ACK" message 804, wherein each attempt is a different redundancy version. At time t4 854 the Source Terminal 100, having received the "ACK" message 804 from the Destination Terminal 600 discontinues transmission of the MSD message 814.

Figure 23B:
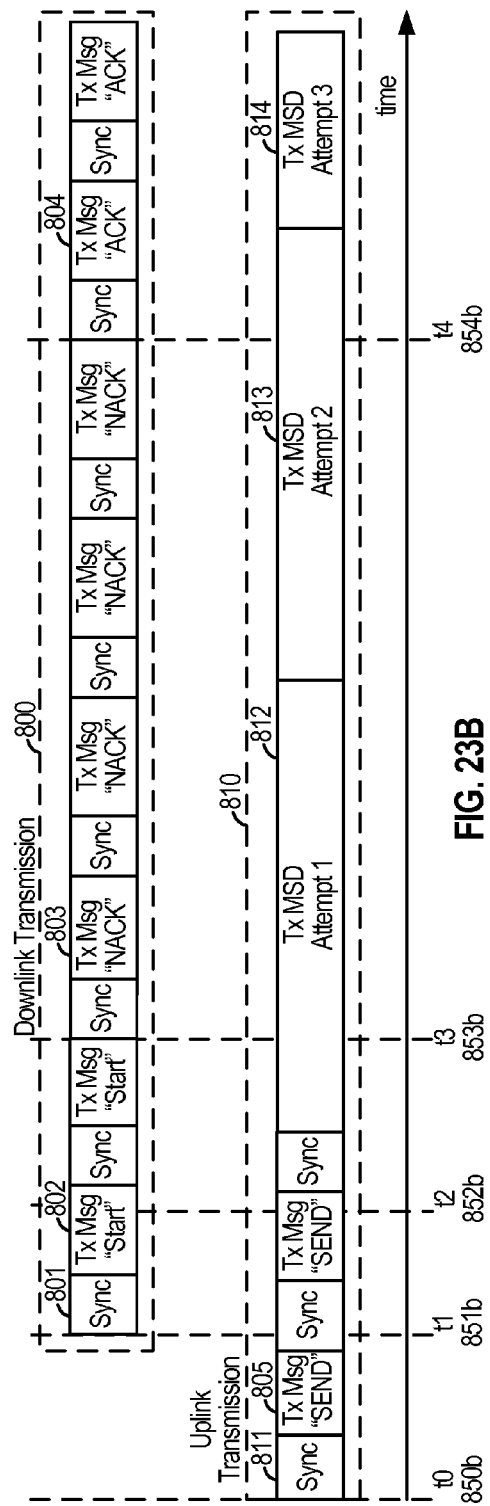
FIG. 23B is a diagram of another embodiment of an interaction of the data request sequence transmitted on a downlink in a destination communication terminal and the data response sequence transmitted on an uplink in a source communication terminal, with the interaction initiated by the source terminal.

FIG. 23B is another example interaction diagram of the synchronization and data transmission sequences between the Source Terminal 100 and the Destination Terminal 600. In this case, the Uplink Transmission sequence 810 is initiated by the Source Terminal 100. Instead of transmitting voice data on the uplink to initiate the transmission, the Source Terminal 100 transmits an alternating sync 811 and "SEND" message 805 at time t0 850b. At time t1 851b the Destination Terminal 600, having received the SEND message 805 from the Source Terminal 100, transmits an alternating sync 801 and "Start" message 802. At time t2 852b the Source Terminal 100, having received the "Start" message 802 from the Destination Terminal 600, transmits a sync sequence 811 followed by an MSD message 812 to the Destination Terminal 600. At time t3 853b the Destination Terminal 600, having received the sync message 811 from the Source Terminal 100, transmits an alternating sync 801 and "NACK" message 803 to the Source Terminal 100. At time t4 854b, the Destination Terminal 600, having successfully received the MSD message, transmits an alternating sync 801 and "ACK" message 804. Upon receiving the "ACK" message 804 from the Destination Terminal 600, the Source Terminal 100 discontinues transmission of the MSD message.

FIG. 24A is an example interaction diagram of the synchronization and data transmission sequences between the Source Terminal 100 and the Destination Terminal 600. In this case, data is requested and transmitted by both the Source Terminal 100 and the Destination Terminal 600 on the Uplink and Downlink respectively in support of bidirectional data transmission. The Downlink Transmission sequence 800 is initiated at time t0 850 by the Destination Terminal 600 with alternating sync sequence 801 and "Start" message 802. At time t1 851 the Source Terminal 100, having received the "Start" message 802 from the Destination Terminal 600, begins transmitting its sync sequence 811 followed by data 812. At time t2 852, The Destination Terminal 600 transmits an alternating sync 801 and "NACK" message 803 until it successfully receives the data 812 from the Source Terminal 100, upon which then the Destination Terminal 600 sends an alternating sync sequence 801 and "ACK" message 804. At time t4 854 the Source Terminal 100, having received the "ACK" message 804 from the Destination Terminal 600 discontinues its data transmission. At time t5 855, the Destination Terminal 600 transmits an alternating sync sequence 801 and "SEND" message 805 indicating a request to transmit data on the downlink. At time t6 856, the Source Terminal 100 upon detecting the "SEND" message 805, responds with an alternating sync sequence 811 and "Start" message 816. At time t7 857, the Destination Terminal 600, upon detecting the "Start" message 816, responds with a sync sequence 801 followed by data 806. At time t8 858, the Source Terminal 100 transmits an alternating sync sequence 811 and "NACK" message 817 until it successfully receives the data 806 from the Destination Terminal 600, upon which at time t9 859 the Source Terminal 100 sends an alternating sync sequence 811 and "ACK" message 818. At time t10 860 the Destination Terminal 600, having received the "ACK" message 818 from the Source Terminal 100 discontinues transmission of its data 806. One skilled in the art will recognize that the interactions described herein are symmetric and may be initiated by the Source Terminal 100. One skilled in the art will also recognize that the sync sequence, Start message, NACK message, and ACK message may each be the same or different sequences between those transmitted on the downlink and uplink.

FIG. 24B is a another example interaction diagram of the synchronization and data transmission sequences between the Source Terminal 100 and the Destination Terminal 600, wherein data is requested and transmitted by both the Source Terminal 100 and the Destination Terminal 600 on the Uplink and Downlink respectively. The difference between the interactions of FIG. 24B and FIG. 24A occurs at t3 853. In this example, an alternating sync 801 and "SEND" message 805 is transmitted by the Destination Terminal 600 instead of an alternating sync and "ACK" message. In this example, the "SEND" message 805 serves to indicate that the Destination Terminal 600 has successfully received the Source Terminal 100 data 812, and results in the Source Terminal 100 discontinuing its data transmission at t4 854. The "SEND" message also indicates a request from the Destination Terminal 600 to send data on the Downlink.

Figure 25:
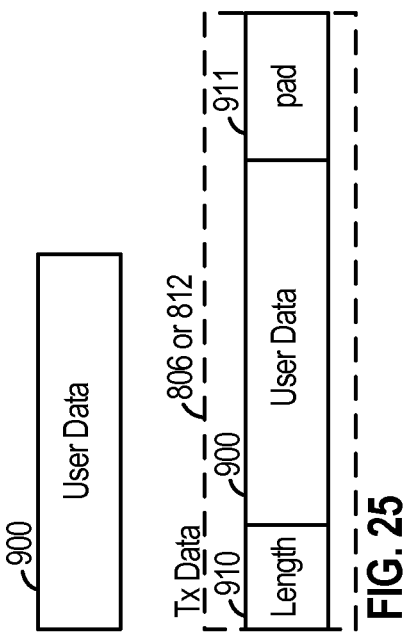
FIG. 25 is a diagram of an embodiment of a user data packet format where the length of the user data length is less than the transmit packet size.

FIG. 25 is an example diagram of the composition of a transmit data packet whereby the length of the user data is less than the transmit data packet length. The user data segment 900 is assembled into the transmit data packet 806 or 812 along with a preceding length indicator 910 and a following sequence of pad bits 911 which served to fill out the data to the end of transmit data packet. A suitable example for the length indicator 910 is a 1 to 3 byte value indicating the length of the user data segment 900. A suitable example of the transmit data packet length 806 or 812 may be 100-200 bytes. A suitable example of pad bits 911 include the binary "0" value. One skilled in the art will recognize that the pad bits 911 may be comprised of the binary "1" value or may be comprised of a pattern of binary "1" and "0" values.

Figure 26:
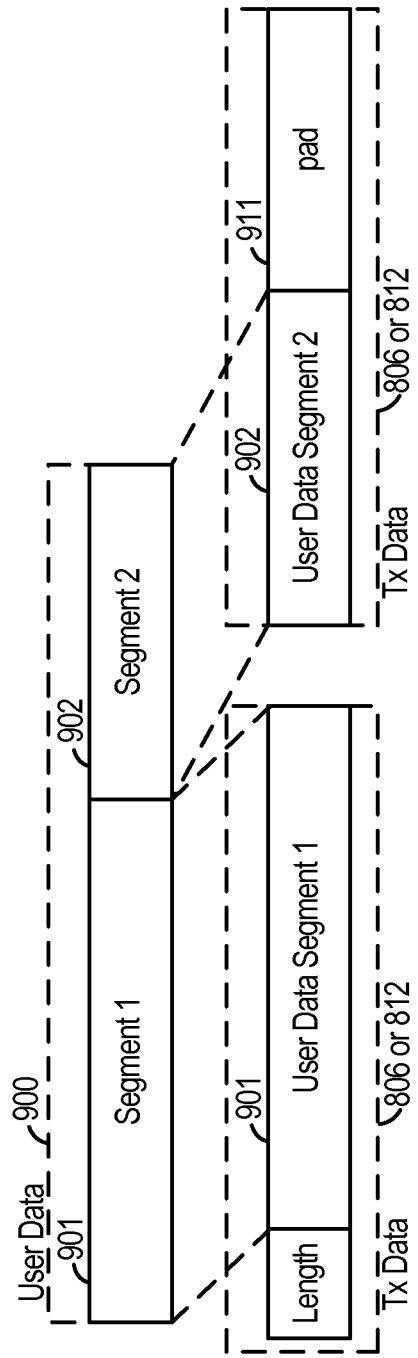
FIG. 26 is a diagram of an embodiment of a user data packet format where the length of the user data length is greater than the transmit packet size.

FIG. 26 is an example diagram of the composition of a transmit data packet whereby the length of the user data is greater than the transmit data packet length. The user data 900 is split into multiple segments such that the first segment plus the length indicator is equal to the transmit data packet length and subsequent segments are equal to the transmit data packet length. If the user data is not an integer multiple of the transmit data packet length, then the last segment contains a pad. In the example of FIG. 26, the user data is split into two segments. The first user data segment 901 is assembled into the transmit data packet 806 or 812 along with a preceding length indicator 910. The second user data segment 902 is assembled into the transmit data packet 806 or 812, and because the segment is smaller than the transmit data packet length a pad 911 is used to fill out the data to the end of the transmit data packet.

FIG. 27A is an example interaction diagram of the transmit data request sequence and transmit data response sequence, wherein the user data length is greater than the transmit packet size. Initiated by the Start messages of the requesting terminal in either the downlink transmission 800 or the uplink transmission 810, at time t20 870, the first transmit data packet 806 or 812 comprised of a length indicator 910 and first user data segment 901 is transmitted by the responding terminal. At time t21 871, since the responding terminal has not yet received the ACK message, it begins transmitting the user data again in a second attempt 903. At time t22 872, the responding terminal, having received the ACK message, discontinues transmission of the first data packet 806 or 812. At time t23 873, the requesting terminal, after evaluating the length indicator 910 to determine how many segments are expected, requests the next transmit data packet 806 or 812 by transmitting start messages to the responding terminal. At time t24 874, the responding terminal, having received the start message from the requesting terminal, begins transmitting the next transmit data packet 806 or 812 comprised of a next user data segment 902 and pad 911 (in this example the next transmit data packet is the last data packet). At time t25 875, the responding terminal, having received the ACK message, discontinues its data transmission. One skilled in the art will recognize that the interactions described herein are symmetric whereby the requesting and responding terminals may be either the Source Terminal 100 or the Destination Terminal 600. One skilled in the art will also recognize that the user data may span more than two transmit data packets 806 or 812.

FIG. 27B is another example interaction diagram of the transmit data request sequence and transmit data response sequence, wherein the user data length is greater than the transmit packet size. In this example, after the first transmit data packet 806 or 812 is requested via Start messages transmitted by the requesting terminal, the subsequent transmit data packets 806 or 812 are automatically transmitted by the responding terminal based on receiving the ACK message from the requesting terminal. In this example, the requesting terminal does not transmit Start messages to initiate transmission of the subsequent transmit data packet 806 or 812 from the responding terminal. At time t31 881, the responding terminal, having received the ACK message, discontinues the transmission of the first data packet then immediately begins transmitting the next transmit data packet 806 or 812 separated only by a sync sequence. At time t32 882, the requesting terminal, having received the sync sequence, begins transmitting NACK messages until it successfully receives the transmit data packet 806 or 812. At time t33 883, having successfully received the transmit data packet 806 or 812, the requesting terminal begins transmitting the ACK messages. At time t34 884, the responding terminal having received the ACK message discontinues transmission of the transmit data packet 806 or 812.

Figure 27C:
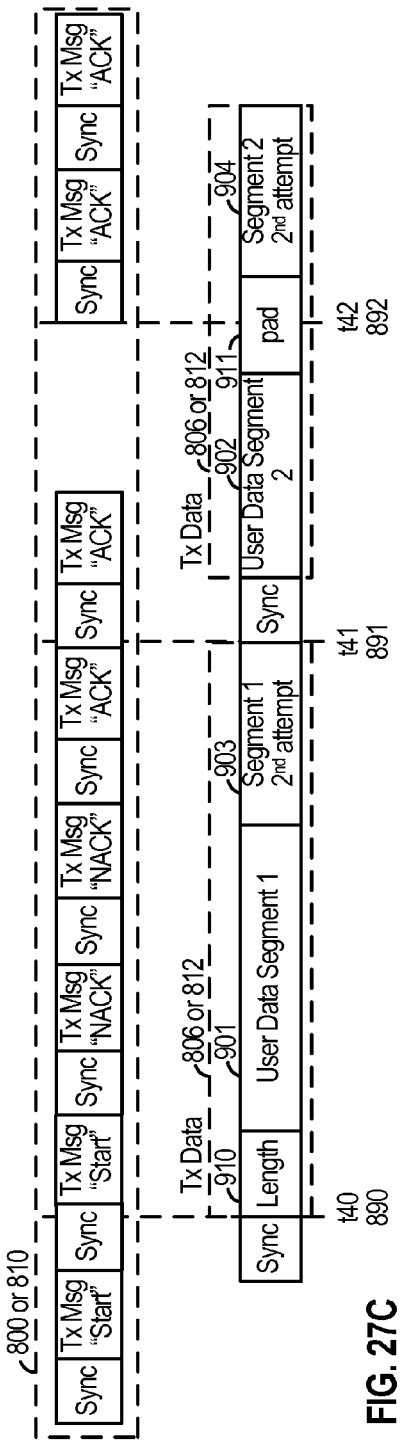
FIG. 27C is a diagram of yet another embodiment of an interaction of the transmit data request sequence and transmit data response sequence, wherein the user data length is greater than the transmit packet size.

FIG. 27C is yet another example interaction diagram of the transmit data request sequence and transmit data response sequence, wherein the user data length is greater than the transmit packet size. In this example, after the first transmit data packet 806 or 812 is requested via Start messages transmitted by the requesting terminal, the subsequent transmit data packets 806 or 812 are automatically transmitted by the responding terminal based on receiving the ACK message from the requesting terminal. In this example, the requesting terminal does not transmit Start messages to initiate transmission of the transmit data packet 806 or 812 from the responding terminal nor does the requesting terminal transmit NACK messages. At time t41 891, the responding terminal, having received the ACK message, discontinues the transmission of the first data packet then immediately begins transmitting the next transmit data packet 806 or 812 separated only by a sync sequence. At time t42 892, having successfully received the transmit data packet 806 or 812, the requesting terminal begins transmitting the ACK messages. Once the responding terminal receives the ACK messages, it discontinues transmission of the transmit data packet 806 or 812.

Figure 27D:
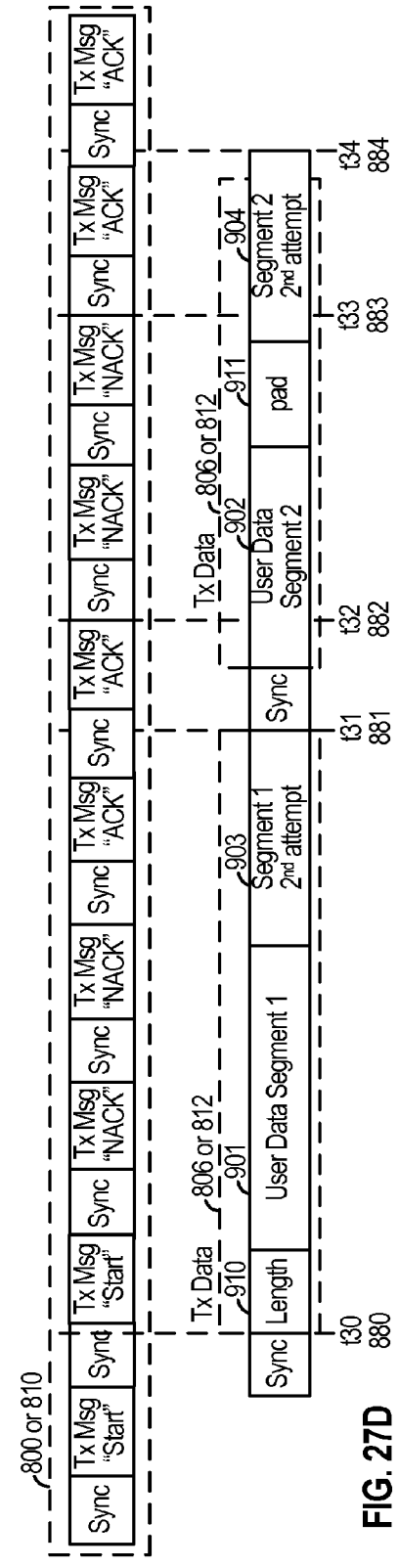
FIG. 27D is a diagram of still another embodiment of an interaction of the transmit data request sequence and transmit data response sequence, wherein the user data length is greater than the transmit packet size.

FIG. 27D is still another example interaction diagram of the transmit data request sequence and transmit data response sequence, wherein the user data length is greater than the transmit packet size. FIG. 27D is an alternate to the example interaction diagram shown in FIG. 27B. In the example of FIG. 27D, the time gap at t32 882 between the requesting terminal ACK message for the first user data segment 903 and the NACK for the next user data segment 902 is eliminated. This helps to maintain timing at the responding terminal such that it would not need to resynchronize to the requesting terminal sync sequence.

One skilled in the art would recognize that the responding terminals may automatically transmit data packets subsequent to the first data packet without transmitting the sync sequence separator. In this case the sync sequence is sent once prior to the first transmit data packet 806 or 812, then upon receiving the ACK messages the responding terminal automatically transmits the subsequent data packet without sending a sync. One skilled in the art would also recognize that a length indicator 910 could also be transmitted with other data segments in addition to the first one.

In the interaction diagrams disclosed herein, there may be error conditions which should be responded to and handled in a predetermined manner. The following sections provide examples on the error condition handling corresponding to the interaction diagrams disclosed herein. In each example, the error condition is stated along with the corresponding response description. One skilled in the art will recognize that the error handling described herein may be equally applied to the source or destination terminal in both unidirectional and bidirectional embodiments.

An example error condition occurs when the Source Terminal does not detect a transmitted sync preamble. In an example response, the Source Terminal delays the transmission of the MSD message until a predetermined number of sync preambles have been detected.

Another example error condition occurs when the Source Terminal incorrectly detects a sync preamble. In an example response, the Source Terminal delays the transmission of the MSD message until a predetermined number of detected sync preambles yield the same sample offset.

Another example error condition occurs when the Source Terminal falsely detects a sync preamble although there was none actually transmitted. In an example response, the Source Terminal ignores the falsely detected sync preambles. The Source Terminal would only trigger the MSD transmission if a predetermined number of detected sync preambles yield the same sample offset estimate.

Another example error condition occurs when the Destination Terminal does not detect a transmitted sync preamble. In an example response, the Destination Terminal does not start decoding the MSD message, but continues transmitting START messages so as to trigger the Source Terminal to reinitiate the MSD transmission after a predetermined number of START messages is received (including the sync preamble sequence).

Another example error condition occurs when the Destination Terminal incorrectly detects a sync preamble. In an example response, the Destination Terminal decodes the received MSD data incorrectly throughout all redundancy versions. Based on the incorrectly decoded data, the Destination Terminal may reinitiate the MSD transmission by sending START messages to the Source Terminal.

Another example error condition occurs when the Destination Terminal falsely detects a sync preamble although there was none actually transmitted. There is no response since the probability of this happening is very low. The Destination Terminal does not start monitoring its received signal until it expects a sync preamble from the Source Terminal.

Another example error condition occurs when the Source Terminal misinterprets a START message as a NACK message. In an example response, if the MSD transmission has not started, the Source Terminal delays the MSD transmission until it receives a START message. In another example response, if the MSD transmission is ongoing, the Source Terminal delays the reinitialization of the transmission.

Another example error condition occurs when the Source Terminal misinterprets a START message as an ACK message. In an example response, if the MSD transmission has not started, the Source Terminal ignores any ACK message. In another example response, the Source Terminal ignores the ACK if the previous messages have been interpreted as a START message. In yet another example response, if the previous messages were NACK messages, the Source Terminal puts itself on hold and terminates the MSD transmission if the next message is also interpreted as an ACK. In still another example response, if the previous message has been interpreted as an ACK, the Source Terminal terminates the MSD transmission erroneously. The probability of this event is low, however, if it does occur, the Destination Terminal may reinitiate the transmission again by sending a request with START messages.

Another example error condition occurs when the Source Terminal misinterprets a NACK message as a START message. In an example response, a single NACK that is interpreted as a START does not have any effect on the MSD transmission. In another example response, a series of NACK messages that are all interpreted as START messages may cause the Source Terminal transmitter to reinitiate the MSD. The Destination Terminal would not expect this and would fail receiving the incoming data, realizing this by incorrectly decoded data. Based on the incorrectly decoded data, the Destination Terminal may request the Source Terminal to reinitiate the transmission by sending START messages.

Another example error condition occurs when the Source Terminal misinterprets a NACK message as an ACK message. In an example response, if the previous message has been interpreted as a START message, the Source Terminal ignores any ACK message. In another example response, if the previous message has been interpreted as a NACK message, the Source Terminal waits for another ACK. If the following message is not another ACK, the current ACK is ignored. In yet another example response, if the previous message has also been erroneously detected as an ACK message, the Source Terminal may terminate the MSD transmission although the Destination Terminal has not yet received the MSD correctly. The probability of this event is low, however, if it does occur, the Destination Terminal may reinitiate the transmission again by sending a request with START messages.

Another example error condition occurs when the Source Terminal misinterprets an ACK message as a START message. In an example response, the Source Terminal would not abort the transmission of additional redundancy versions of the MSD, since the usual abort condition is the reception of a predetermined number of ACK messages. If more subsequent messages are interpreted as START messages, the Source Terminal may reinitiate the MSD transmission. Eventually, the Destination Terminal would stop transmitting messages. The Source Terminal would eventually determine that the Destination Terminal is no longer transmitting sync frames and reset itself, thereby stopping further transmissions.

Another example error condition occurs when the Source Terminal misinterprets an ACK message as a NACK message. In an example response, the Source Terminal would continue transmitting redundancy versions until the ACK messages are detected correctly. Eventually, the Destination Terminal would stop transmitting messages. The Source Terminal would eventually determine that the Destination Terminal is no longer transmitting sync frames and reset itself, thereby stopping further transmissions.

Another example error condition occurs when the Source Terminal determines that a received message is unreliable. In an example response, if the received messages are START messages, the Source Terminal continues to count the unreliable messages but with a lower weighting factor than if the messages were received with a reliable determination. The subsequent trigger of an event based on the count of received messages will require a larger predetermined number of unreliable messages received versus if the messages were received with a reliable determination. In another example response, if the unreliable received messages are NACK messages or ACK messages, the Source Terminal may ignore the messages.

Another example error condition occurs when the Destination Terminal is unable to detect the transmitted MSD due to noise or other channel distortions. In an example response, after attempting to decode a predetermined number of redundancy versions, the Destination Terminal may request the Source Terminal reinitiate the transmission by sending START messages. In the reinitiated transmission, the Source Terminal may use the robust modulator, which is less prone to noise and other channel distortions.

Another example error condition occurs when the Destination Terminal cannot evaluate the wakeup signal correctly. In an example response, if the Destination Terminal considers the wakeup signal detection unreliable, it chooses the fast (or normal) modulation mode for the first trial of demodulating the MSD data. For any other set of a predetermined number of received redundancy versions of the MSD data, the Destination Terminal may use the robust modulation mode to demodulate the data.

Thus, disclosed herein is an apparatus and method of reliably and efficiently transmitting data in-band through a speech codec in a wireless communication system. Those of skill in the art would understand that information and signals may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof. Also, though the embodiments are described primarily in terms of a wireless communication system, the described techniques may be applied to other in-band data communication systems that are fixed (non-portable) or do not involve a wireless channel.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CDROM, or any other form of storage medium known in the art. A storage medium is coupled to the processor such the processor can read information from, and write information to, the storage medium. In the alternative, the storage medium may be integral to the processor. The processor and the storage medium may reside in an ASIC. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of controlling bidirectional data transmissions from a destination terminal in an in-band communication system, the method comprising:
    transmitting a start signal from the destination terminal;
    discontinuing transmission of the start signal upon detection of a first received signal, wherein the first received signal indicates a successful reception of the start signal from a source terminal;
    transmitting a negative acknowledgment (NACK) signal from the destination terminal, whereby the source terminal is constrained to respond in a first predetermined manner;
    discontinuing transmission of the NACK signal upon detection of a successfully received source terminal data message;
    transmitting an acknowledge (ACK) signal from the destination terminal, whereby the source terminal is constrained to respond in a second predetermined manner;
    discontinuing transmission of the ACK signal after a predetermined number of ACK signals have been transmitted;
    transmitting a send signal from the destination terminal;
    discontinuing transmission of the send signal upon detection of a second received signal, wherein the second received signal indicates a successful reception of the send signal from the source terminal;
    transmitting a synchronization signal from the destination terminal;
    transmitting a user data segment from the destination terminal using a first modulation scheme;
    discontinuing transmission of the user data segment upon detection of a third received signal, wherein the third received signal indicates a successful reception of the user data segment from the source terminal;
    and switching to a second modulation scheme if the destination terminal receives a predetermined number of a fourth received signal, wherein the fourth received signal indicates an unsuccessful reception of the user data segment from the source terminal.

2. The method of claim 1 wherein the send signal is comprised of a synchronization signal followed by a send message.

3. The method of claim 1 wherein the start signal is comprised of a synchronization signal followed by a start message.

4. The method of claim 1 wherein the NACK signal is comprised of a synchronization signal followed by a NACK message.

5. The method of claim 1 wherein the ACK signal is comprised of a synchronization signal followed by an ACK message.

6. The method of claim 1 wherein the successfully received source terminal data message is the data message verified by a cyclic redundancy check.

7. An apparatus for controlling bidirectional data transmissions from a destination terminal in an in-band communication system comprising:
    a processor;
    memory in electronic communication with the processor; and instructions stored in the memory, the instructions being capable of executing the steps of:
    transmitting a start signal from the destination terminal;
    discontinuing transmission of the start signal upon detection of a first received signal, wherein the first received signal indicates a successful reception of the start signal from a source terminal;
    transmitting a negative acknowledgment (NACK) signal from the destination terminal, whereby the source terminal is constrained to respond in a first predetermined manner;
    discontinuing transmission of the NACK signal upon detection of a successfully received source terminal data message;
    transmitting an acknowledge (ACK) signal from the destination terminal, whereby the source terminal is constrained to respond in a second predetermined manner;
    discontinuing transmission of the ACK signal after a predetermined number of the ACK signals have been transmitted;
    transmitting a send signal from the destination terminal;
    discontinuing transmission of the send signal upon detection of a second received signal, wherein the second received signal indicates a successful reception of the send signal from the source terminal;
    transmitting a synchronization signal from the destination terminal;
    transmitting a user data segment from the destination terminal using a first modulation scheme;
    discontinuing transmission of the user data segment upon detection of a third received signal, wherein the third received signal indicates a successful reception of the user data segment from the source terminal;
    and switching to a second modulation scheme if the destination terminal receives a predetermined number of a fourth received signal, wherein the fourth received signal indicates an unsuccessful reception of the user data segment from the source terminal.

8. The apparatus of claim 7 wherein the send signal is comprised of a synchronization signal followed by a send message.

9. The apparatus of claim 7 wherein the start signal is comprised of a synchronization signal followed by a start message.

10. The apparatus of claim 7 wherein the NACK signal is comprised of a synchronization signal followed by a NACK message.

11. The apparatus of claim 7 wherein the ACK signal is comprised of a synchronization signal followed by an ACK message.

12. The apparatus of claim 7 wherein the successfully received source terminal data message is the data message verified by a cyclic redundancy check.

13. An apparatus for controlling bidirectional data transmissions from a destination terminal in an in-band communication system comprising:
    means for transmitting a start signal from the destination terminal;
    means for discontinuing transmission of the start signal upon detection of a first received signal, wherein the first received signal indicates a successful reception of the start signal from a source terminal;
    means for transmitting a negative acknowledgment (NACK) signal from the destination terminal, whereby the source terminal is constrained to respond in a first predetermined manner;

means for discontinuing transmission of the NACK signal upon detection of a successfully received source terminal data message;

means for transmitting an acknowledge (ACK) signal from the destination terminal, whereby the source terminal is constrained to respond in a second predetermined manner;

means for discontinuing transmission of the ACK signal after a predetermined number of the ACK signals have been transmitted;

means for transmitting a send signal from the destination terminal;

means for discontinuing transmission of the send signal upon detection of a second received signal, wherein the second received signal indicates a successful reception of the send signal from the source terminal;

means for transmitting a synchronization signal from the destination terminal;

means for transmitting a user data segment from the destination terminal using a first modulation scheme;

means for discontinuing transmission of the user data segment upon detection of a third received signal, wherein the third received signal indicates a successful reception of the user data segment from the source terminal;

and means for switching to a second modulation scheme if the destination terminal receives a predetermined number of a fourth received signal, wherein the fourth received signal indicates an unsuccessful reception of the user data segment from the source terminal.

14. The apparatus of claim 13 wherein the send signal is comprised of a synchronization signal followed by a send message.

15. The apparatus of claim 13 wherein the start signal is comprised of a synchronization signal followed by a start message.

16. The apparatus of claim 13 wherein the NACK signal is comprised of a synchronization signal followed by a NACK message.

17. The apparatus of claim 13 wherein the ACK signal is comprised of a synchronization signal followed by an ACK message.

18. The apparatus of claim 13 wherein the successfully received source terminal data message is the data message verified by a cyclic redundancy check.

19. A non-transitory computer-readable medium storing computer-executable instructions that when executed cause a processor to:
transmit a start signal from a destination terminal; discontinue transmission of the start signal upon detection of a first received signal, wherein the first received signal indicates a successful reception of the start signal from a source terminal;

transmit a negative acknowledgement (NACK) signal from the destination terminal, whereby the source terminal is constrained to respond in a first predetermined manner;

discontinue transmission of the NACK signal upon detection of a successfully received source terminal data message;

transmit an acknowledge (ACK) signal from the destination terminal, whereby the source terminal is constrained to respond in a second predetermined manner;

discontinue transmission of the ACK signal after a predetermined number of the ACK signals have been transmitted;

transmit a send signal from the destination terminal;

discontinue transmission of the send signal upon detection of a second received signal, wherein the second received signal indicates a successful reception of the send signal from the source terminal;

transmit a synchronization signal from the destination terminal;

transmit a user data segment from the destination terminal using a first modulation scheme;

discontinue transmission of the user data segment upon detection of a third received signal, wherein the third received signal indicates a successful reception of the user data segment from the source terminal;

and switch to a second modulation scheme if the destination terminal receives a predetermined number of a fourth received signal, wherein the fourth received signal indicates an unsuccessful reception of the user data segment from the source terminal.

20. The non-transitory computer-readable medium of claim 19 wherein the NACK signal is comprised of a synchronization signal followed by a NACK message.

21. The non-transitory computer-readable medium of claim 19 wherein the ACK signal is comprised of a synchronization signal followed by an ACK message.

22. The non-transitory computer-readable medium of claim 19 wherein the successfully received source terminal data message is the data message verified by a cyclic redundancy check.

23. The non-transitory computer-readable medium of claim 19 wherein the send signal is comprised of a synchronization signal followed by a send message.

24. The non-transitory computer-readable medium of claim 19 wherein the start signal is comprised of a synchronization signal followed by a start message.

* * * * *